US012680828B2

(12) United States Patent
Schweighart

(10) Patent No.: US 12,680,828 B2
(45) Date of Patent: Jul. 14, 2026

---

(54) METHODS AND APPARATUS FOR NAVIGATION WITH POINT MASS FILTERS

(71) Applicant: The Boeing Company, Arlington, VA (US)

(72) Inventor: Samuel Adam Schweighart, Fairfax, VA (US)

(73) Assignee: The Boeing Company, Arlington, VA (US)

( * ) Notice: Subject to any disclaimer, the term of this patent is extended or adjusted under 35 U.S.C. 154(b) by 231 days.

(21) Appl. No.: 18/535,365

(22) Filed: Dec. 11, 2023

(65) Prior Publication Data

US 2025/0189342 A1 Jun. 12, 2025

(51) Int. Cl.
*G01C 21/00* (2006.01)
*B64U 101/00* (2023.01)

(52) U.S. Cl.
CPC ..... *G01C 21/3826* (2020.08); *G01C 21/3867* (2020.08); *B64U 2101/00* (2023.01)

(58) Field of Classification Search
CPC .......................... G01C 21/3867; G01C 21/188
USPC .......................................................... 701/507
See application file for complete search history.

(56) References Cited

U.S. PATENT DOCUMENTS

| | | | | |
|---|---|---|---|---|
| 2017/0269201 A1* | 9/2017 | Adachi | ................. | G01S 13/931 |
| 2018/0165591 A1 | 6/2018 | Dunik et al. | | |
| 2020/0026925 A1* | 1/2020 | Yu | ........................ | G06V 20/188 |
| 2025/0130329 A1* | 4/2025 | John Wilson | ......... | G01S 13/726 |

OTHER PUBLICATIONS

Yoo et al., "Improvement of terrain referenced navigation using a Point Mass Filter with grid adaptation," International Journal of Control, Automation, and Systems, vol. 13, Jul. 14, 2015, pp. 1173-1181, 9 pages. https://doi.org/10.1007/s12555-013-0410-4.

Park et al., "Grid Support Adaptation for Point Mass Filter Based Terrain Referenced Navigation Using Mutual Information," IEEE Sensors Journal, vol. 18, No. 18, Sep. 15, 2018, pp. 7603-7610, 8 pages. DOI: 10.1109/JSEN.2018.2862941.

European Patent Office, "European Search Report," issued in connection with European Patent Application No. 24215094, dated Apr. 7, 2025, 3 pages.

European Patent office, "Written Opinion," issued in connection with European Patent Application No. 24215094.4, dated Apr. 23, 2025, 4 pages.

(Continued)

*Primary Examiner* — Navid Z. Mehdizadeh
*Assistant Examiner* — Vincent Feng
(74) *Attorney, Agent, or Firm* — Hanley, Flight & Zimmerman, LLC

(57) ABSTRACT

Methods and apparatus for navigation with point mass filters are disclosed. A disclosed apparatus to adjust a probabilistic grid of a point mass filter for navigation of a vehicle includes interface circuitry communicatively coupled to a sensor of the vehicle, machine readable instructions, and programmable circuitry to at least one of instantiate or execute the machine readable instructions to move the probabilistic grid based on movement of the vehicle, and perform a linear adjustment of at least a portion of the probabilistic grid with respect to time based on a bounded error corresponding to the movement of the vehicle.

20 Claims, 19 Drawing Sheets

100 ⟶

(56)            References Cited

OTHER PUBLICATIONS

European Patent Office, "Communication Regarding Extended European Search Report," issued in connection with European Patent Application No. 24215094.4, dated Apr. 23, 2025, 1 page.

European Patent Office, "European Search Report," issued in connection with European Patent Application No. 24215094, dated Apr. 23, 2025, 3 pages.

Golden, J. P., "Terrain contour matching (TERCOM): a cruise missile guidance aid," Image processing for missile guidance, vol. 238, SPIE, 1980, pp. 10-18.

Bergman, N., "A Bayesian approach to terrain-aided navigation," IFAC Proceedings vols. vol. 30, No. 11, 1997, pp. 1457-1462.

Bergman, N., "Recursive Bayesian Estimation—Navigation and Tracking Applications," Linkoping Studies in Science and Technology. Dissertations, vol. 579, 1999.

Anonsen, K. B., and Hallingstad, O., "Terrain aided underwater navigation using point mass and particle filters," Proceedings of IEEE/ION Plans 2006, San Diego, CA, 2006, pp. 1027-1035.

Peng, D., Zhou, T., Xu, C., Zhang, W., and Shen, J., "Marginalized point mass filter with estimating tidal depth bias for underwater terrain-aided navigation," Journal of Sensors, vol. 2019, 2019. https://doi.org/10.1155/2019/7340130.

Li, R., All Source Positioning, Navigation and Timing, Artech House GNSS series, Artech House, 2020. URL https://books.google.com/books?id=AnwqEAAAQBAJ.

Matoušek, J., Duník, J., and Straka, O., "Density Difference Grid Design in a Point-Mass Filter," Energies, vol. 13, No. 16, 2020, p. 4080.

* cited by examiner

100

104

106

108

NAVIGATION/
GUIDANCE
SYSTEM

112

102

SENSOR(S)

110

104

106

106

542
PMF Solution Error
Distance Error (m)
Time (s)
$\sigma_V$ = 100m/s
$\sigma_V$ = 75m/s
$\sigma_V$ = 50m/s
$\sigma_V$ = 25m/s
$\sigma_V$ = 10m/s
$\sigma_V$ = 4m/s
FIG. 5E
540
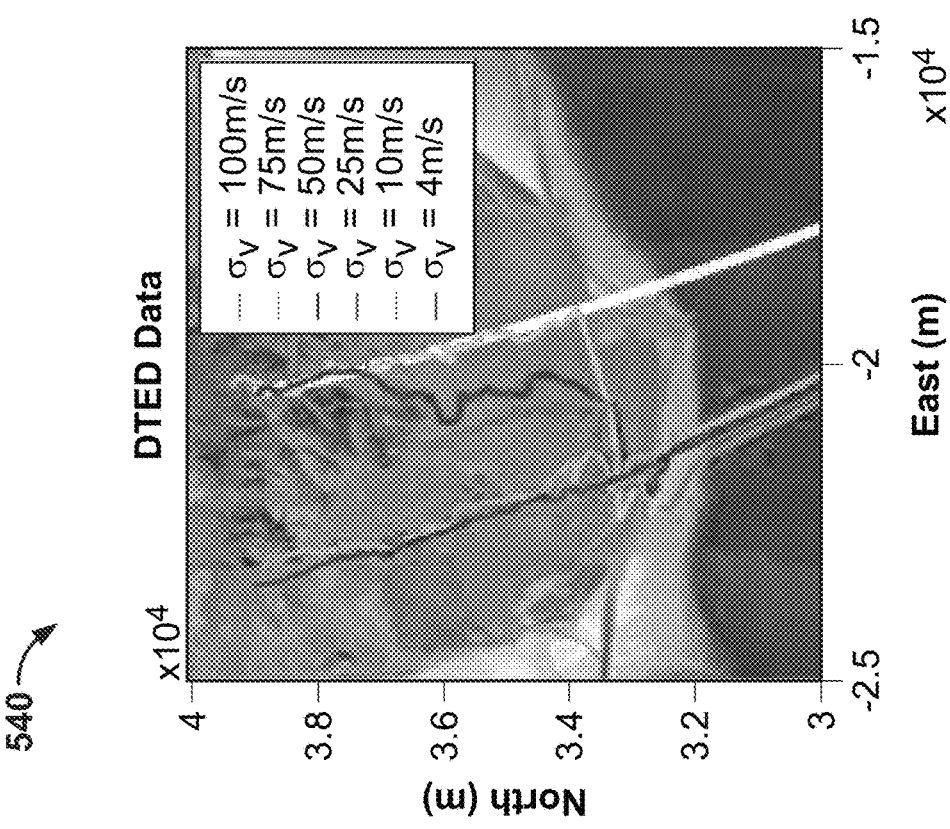
DTED Data
North (m)
East (m)
$\sigma_V$ = 100m/s
$\sigma_V$ = 75m/s
$\sigma_V$ = 50m/s
$\sigma_V$ = 25m/s
$\sigma_V$ = 10m/s
$\sigma_V$ = 4m/s

700

START

702 — DETERMINE ERROR

704 — MOVE GRID

706 — ADJUST/SMOOTH GRID

708 — RETRIEVE, ACCESS AND/OR SELECT TERRAIN DATA FROM DATA STORAGE

709 — DETERMINE ELEVATION

710 — COMPARE ELEVATION TO TERRAIN DATA

712 — ADJUST VALUES OF GRID

714 — DETERMINE/ESTIMATE POSITION

716 — GUIDE VEHICLE

END

METHODS AND APPARATUS FOR NAVIGATION WITH POINT MASS FILTERS

FIELD OF THE DISCLOSURE

This disclosure relates generally to vehicle navigation and, more particularly, to methods and apparatus for terrain aided navigation with point mass filters.

BACKGROUND

Point mass filters (PMFs) have been utilized in terrain aided navigation (TAN). PMFs typically operate under the assumption that velocity estimates of a vehicle have zero-mean error. This limitation can cause the performance of a PMF to decrease when an aircraft is flying over areas with low information (e.g., flat ground, water bodies, etc.). In particular, errors can be manifested in unmanned air systems (UASs), including unmanned aerial vehicles (UAVs) that utilize low-quality microelectronic mechanical systems (MEMS) (e.g., inertial measurement units (IMUs)). To mitigate these errors, an estimated error of a velocity estimate can be artificially increased. However, the degree to which the velocity estimate is increased is typically dependent on the flatness of an area over which the UAV is travelling and, further, it is difficult to determine independent of a flight path. Increasing the error estimate by these methodologies can also degrade overall filter performance.

SUMMARY

An apparatus to adjust a probabilistic grid of a point mass filter for navigation of a vehicle includes interface circuitry communicatively coupled to a sensor of the vehicle, machine readable instructions, and programmable circuitry to at least one of instantiate or execute the machine readable instructions to move the probabilistic grid based on movement of the vehicle, and perform a linear adjustment of at least a portion of the probabilistic grid with respect to time based on a bounded error corresponding to the movement of the vehicle.

An example non-transitory machine readable storage medium includes instructions to cause programmable circuitry to at least move a probabilistic grid of a point mass filter corresponding to navigation of a vehicle based on movement of the vehicle, and perform a linear adjustment of at least a portion of the probabilistic grid with respect to time based on a bounded error corresponding to the movement of the vehicle.

An example method includes moving, by executing instructions with programmable circuitry, a probabilistic grid of a point mass filter for navigation of a vehicle based on a movement of the vehicle, and performing, by executing instructions with the programmable circuitry, a linear adjustment of at least a portion of the probabilistic grid with respect to time based on a bounded error corresponding to movement of the vehicle.

BRIEF DESCRIPTION OF THE DRAWINGS

FIGS. 5A-5H depict aspects of example results corresponding to examples disclosed herein.

Figure 1:
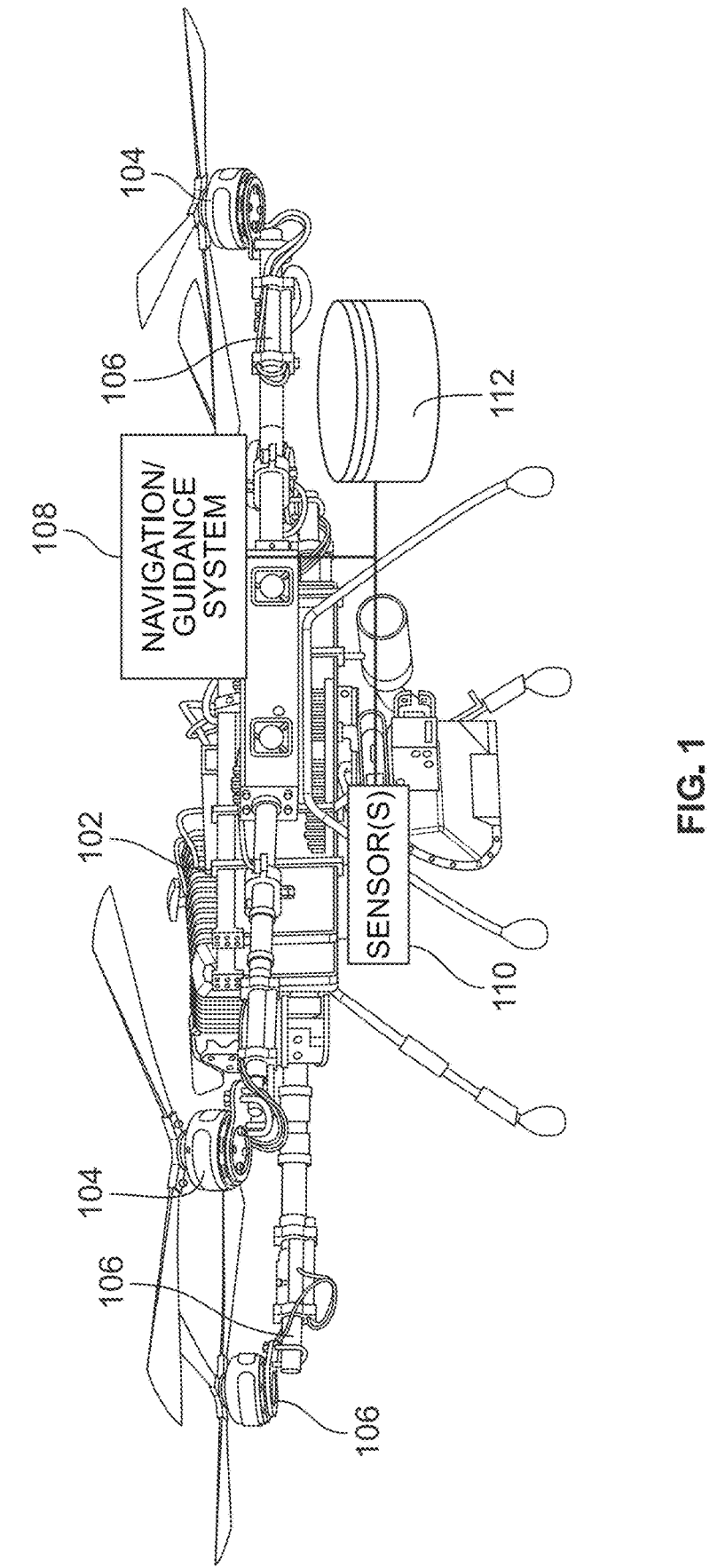
FIG. 1 is an example vehicle in which examples disclosed herein can be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

FIG. 1 is an example vehicle 100 in which examples disclosed herein can be implemented. The vehicle 100 of the illustrated example is implemented as an unmanned aerial vehicle (UAV) and/or an unmanned aerial system (UAS). In this example, the vehicle 100 is guided autonomously such that the vehicle 100 is at least partially self-guided. The example vehicle 100 includes a body 102, rotors 104, supports 106 that support respective ones of the rotors 104, a navigation/guidance system 108, at least one sensor 110 and a data storage 112. In this example, the sensors 110 include an altimeter (e.g., a barometer) and a ground elevation sensor (e.g., a radar altimeter, a laser altimeter, etc.). Additionally, the sensor(s) 110 may include an inertial measurement unit (IMU). However, any other similar sensor type can be implemented instead.

To guide the vehicle 100, the navigation/guidance system 108 of the illustrated example controls the rotors 104 based on information corresponding to terrain aided navigation (TAN). In this example, the TAN is performed with elevation data of terrain from the sensor(s) 110 to guide movement of the vehicle 100. In this particular example, elevation data captured by the sensor(s) 110 correspond to the elevation of the terrain and/or a surface of a body of water below the aircraft. In turn, the data is compared to a database of terrain elevation data stored in the data storage 112 for a positional determination/estimation which, in turn, can be utilized for navigation and/or guidance of the vehicle 100. Such an implementation is particularly advantageous in scenarios where global navigation satellite system (GNSS) signals, such as global positioning system (GPS) signals, are no longer available or are being jammed.

Known implementations utilize Bergman's Bayesian approach, as described in "A Bayesian approach to terrain-aided navigation," IFAC Proceedings Volumes, Vol. 30, No. 11, 1997, pp. 1457-1462 and "Recursive Bayesian Estimation-Navigation and Tracking Applications," Linkoping Studies in Science and Technology. Dissertations, Vol. 579, 1999, both of which are hereby incorporated by reference in their entireties. Peng, D, Zhou, T., Xu, C., Zhang, W., and Shen, J., "Marginalized point mass filter with estimating tidal depth bias for underwater terrain-aided navigation," Journal of Sensors, Vol. 2019, 2019. https://doi.org/10.1155/2019/7340130, which is hereby incorporated by reference in its entirety, expands on Bergman's approach by accounting for bias errors in the vehicle altitude (barometer) measurement through a method referred to as marginalized Point Mass Filter (mPMF). Both the approaches proposed by Berman and Peng et al with respect to a point mass filter (PMF), an error in velocity measurement is assumed to be stochastic with a zero mean, as well as an a priori estimated standard deviation, which can result in inaccuracies and/or instabilities when flying over flat or near-flat terrain. However, these assumptions can be valid when a direct velocity measurement, such as Doppler radar data, is available. Velocity sensors can have zero bias or near-zero bias such that known algorithms can operate well therewith. However, in many UAS implementations, a direct measurement of a velocity of a vehicle is not available. Accordingly, the velocity can be estimated by utilizing onboard IMU estimation possibly augmented by airspeed sensing, and/or estimates of wind speed, etc.

In reality, absent an external absolute position measurement, a non-zero mean error (or bias) in a velocity estimate is common in known implementations. However, the velocity estimate can be bounded (e.g., as a bounded error). Accordingly, when there is bias in the velocity error, the PMF of known implementations does not expand a probability density function (PDF) grid quickly enough when a vehicle is in flight over flat terrain. As result, a vehicle location/position can move off the grid (e.g., a positional grid, a search grid, a probabilistic location grid, etc.) and cause the PMF to be unsuccessful for locating the vehicle 100. Thus, a known implementation utilizing a PMF can be unreliable and unusable for numerous UAS applications. Mitigating a velocity error can be performed by increasing an a priori estimate of a standard deviation of velocity error to expand the grid in a quick manner. However, with such a methodology the grid does not typically expand rapidly enough to prevent the UAS location/position from moving off of the grid. At the same time, artificially increasing this estimate can cause the PMF performance to degrade due to the grid being over-smoothed, thereby essentially removing an excess amount of information from a PDF enumerated over a grid $\mathbb{G}$ and denoted as $\overset{\boxplus}{\boldsymbol{p}}_f(i, j)$. Examples disclosed can advantageously expand and/or contract the grid as needed while retaining accuracy.

Examples disclosed herein advantageously implement a PMF based on an overall bounded velocity error of the vehicle 100. By advantageously bounding the velocity error, examples disclosed herein utilize the PMF to recover a position of the vehicle 100 once the vehicle 100 is in flight over areas having low information (e.g., low texture detail, less varied terrain, etc.) of any arbitrary size. Accordingly, examples disclosed can perform positional determinations/estimations without degradation of filter performance or computational burden. In contrast to known implementations, examples disclosed herein do not utilize an assumption of a zero-mean error in a velocity measurement but, instead, utilize a bounded velocity error. According to examples disclosed herein, as long as the velocity error is less than a bounded value, the grid can be expanded in a quick manner to retain the location of the vehicle 100 bounded within the grid without a significant loss of accuracy or an increase in computational workload. Examples disclosed herein also can advantageously remove a bias in known PMF algorithms that favor likely solutions in proximity of other likely solutions. However, even if a solution is much more probable than another, when the solution is isolated, examples disclosed herein can suppress that solution as an option. Examples disclosed herein are not generally impacted by bias and can maintain a relative likelihood of each point of the aforementioned grid.

While the vehicle 100 is implemented as a UAV in this example, the vehicle 100 can be implemented as any other appropriate type of vehicle, projectile, ground-based vehicle, a water vehicle, a hovering vehicle, a submersible, etc. In such examples where the vehicle 100 is implemented as a ground-based vehicle or hovering vehicle, the vehicle 100 may utilize TAN and/or TAN-like methodologies in examples disclosed herein with a relatively close proximity to the ground.

Figure 2:
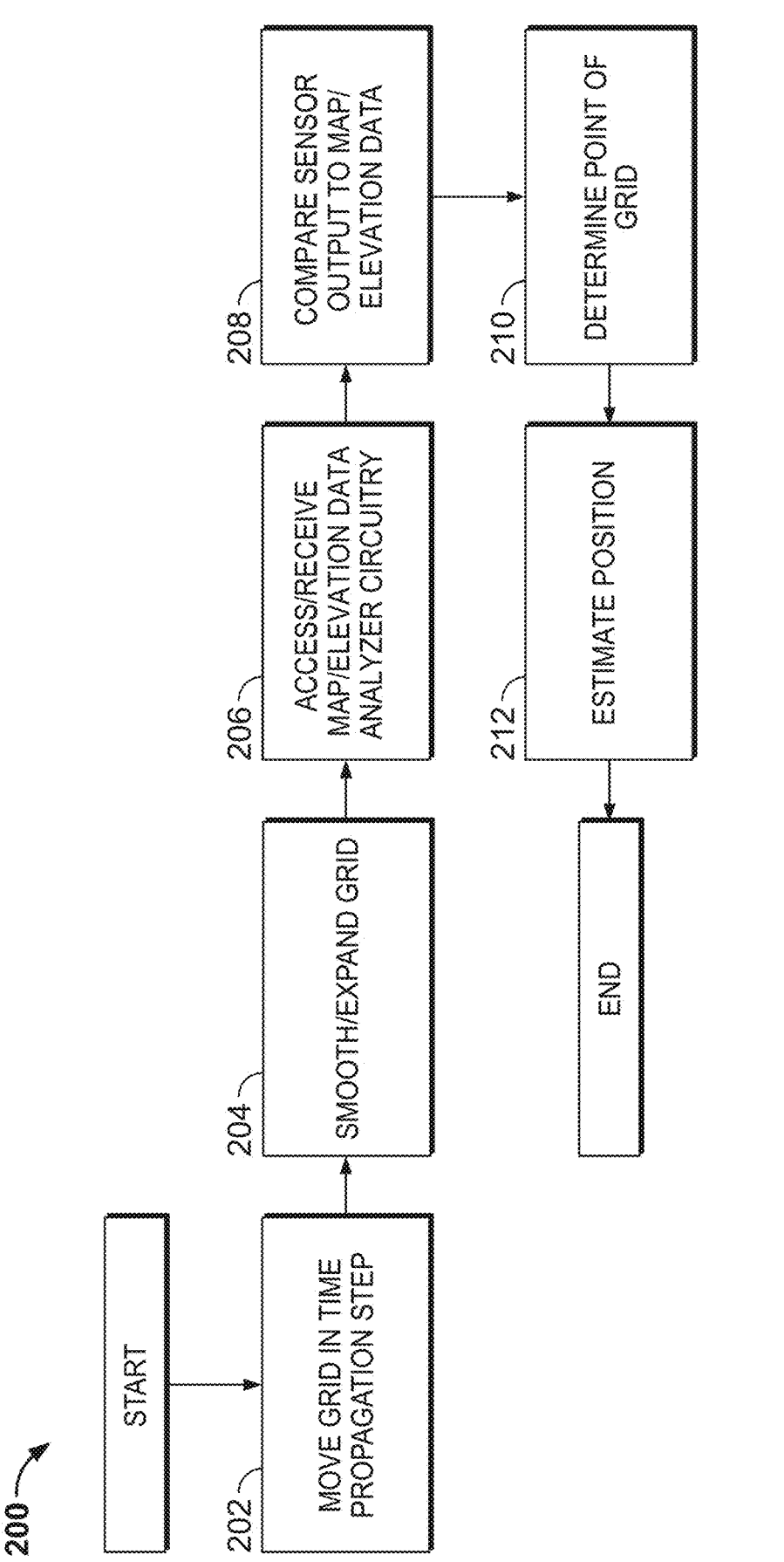
FIG. 2 is a block diagram depicting an example process flow in accordance with teachings of this disclosure.

FIG. 2 is a block diagram depicting an example process flow 200 in accordance with teachings of this disclosure. In the illustrated example of FIG. 2, the vehicle 100 of FIG. 1 is in flight over terrain and has lost acquisition of GNSS signals (e.g., the GNSS signals have been jammed, external conditions have diminished the GNSS signals, etc.). Further, the vehicle 100 is in flight over terrain that may lack details and/or a body of water. In this example, the vehicle 100 is performing TAN based on output from the sensor(s) 110. In particular examples, the sensor(s) 110 include/includes an elevation measurement device (e.g., a laser range finder) or other device to obtain elevation data of terrain corresponding to a location and/or surrounding area of the vehicle 100.

At block 202, a grid of the illustrated example is moved in a time propagation step. According to examples disclosed herein, the time propagation step occurs between elevation measurements (e.g., successive elevation measurements, successive terrain comparisons, etc.), and can include and/or correspond to two primary steps: (i) moving the grid, and (ii) smoothing/expanding the grid. Between the elevation measurements, the vehicle 100 moves and the velocity (e.g., estimated velocity) of the vehicle 100 can be utilized. According to examples disclosed herein, when the vehicle 100 moves between elevation measurements, the grid, as a result, moves based on a measured velocity of the vehicle 100 so that the location of the vehicle 100 remains within the grid and potentially aligned with the corresponding point in the grid, for example. During the movement of the grid, an error in the velocity measurement is present. In particular, the error in the velocity measurement can cause the grid to be moved incorrectly. In the frame of reference of the grid, the error can cause the actual location to move within the grid. Accordingly, the vehicle 100 may no longer be under the peak point in $\overset{\boxplus}{\boldsymbol{p}}_f(i, j)$ and, in a worst case scenario, the vehicle 100 has moved off of the grid without adjustment of the grid.

At block 204, according to examples disclosed herein, a size of the grid is adjusted (e.g., expanded) and a smoothing technique is applied to the grid. Further, examples disclosed herein can account for points along the edge of the grid. In this example, when $\overset{\boxplus}{\boldsymbol{p}}_f(i, j)$ is relatively smoothed out, the grid is expanded to capture and/or encompass new possible/potential locations of the vehicle 100. If the location of the vehicle 100 is on or proximate the edge of the grid, and there is a probability the vehicle 100 could move off of the grid, examples disclosed herein can expand the size of the grid linearly with respect to time, thereby ensuring that the location remains within borders (e.g., outer edges) of the grid. According to examples disclosed herein, the PMF utilizes a grid of points with associated probabilities that the vehicle 100 is at that location. Accordingly, smoothing the grid represents a mathematical interpretation of the vehicle 100 moving within the grid based on probability statistics corresponding to the aforementioned velocity measurement error. According to examples disclosed herein, when smoothing results in points off of the grid having non-insignificant corresponding probabilities, the grid can be expanded to capture those points.

According to examples disclosed herein, during each iteration of the PMF, the grid can be repeatedly expanded and/or contracted. To that end, ground elevation measurements may be utilized to identify points that are not likely the location solution of the vehicle 100 and, thus, can move (e.g., push) a relative probability of those points down. When a probability of a point is relatively low, examples disclosed can remove/cull the point (e.g., the point along with other points in relatively close proximity thereto) from the grid. Between measurements, according to examples disclosed herein, the implemented PMF utilizes an estimate of error in velocity measurements to smooth and expand the grid. In some examples, the repeated expanding and contraction of the grid can reach a steady state point such that the size of the grid remains relatively constant. However, when the vehicle 100 flies over terrain with more varied and/or defined elevation (e.g., elevation with more terrain information), the grid can be reduced in size because the PMF is able to rule out additional grid points as possible locations. When the example vehicle 100 flies over flat terrain, the PMF may not be able to rule out points based on a lack of information in an elevation measurement. In such scenarios, the grid can be continually expanded. Accordingly, once the example vehicle 100 begins to fly over varied terrain again, the filter can rule out a large number of the points in a relatively quick manner, and, thus, the grid can be shrunk and/or reduced in size.

At block 206, map/elevation data is accessed and/or retrieved from the data storage 112 carried by the vehicle 100. In this example, the map/elevation data corresponds to elevation data of a region at or proximate the vehicle 100 (e.g., a last known position, a determined/estimated position prior to the vehicle 100 losing track of the GNSS signals, etc.). According to some examples disclosed herein, the map/elevation data is taken from satellite and/or mapping data. In other examples, the map/elevation data is obtained and/or retrieved from a wireless communication system (e.g., a cellular network, a wireless communication network, etc.).

At block 208, in the illustrated example of FIG. 2, sensor output from the sensor(s) 110 is/are compared to the aforementioned map/elevation data. In this example, multiple points of terrain are measured and/or analyzed to define a ground elevation measurement. For example, the points may be measured by a combination of a barometer, a laser/radar range finder, etc. In the illustrated example of FIG. 2, a PMF is utilized to compare the ground elevation measurement to a digital elevation map (e.g., stored in the data storage 112). In turn, the aforementioned points of the terrain are utilized and/or represented in the aforementioned grid such that each point of the grid corresponds to a measured point on the ground. According to examples disclosed herein, the elevation of each point of the grid is matched to the aforementioned measured elevation. How well a point matches the measured elevation is stored (as their rank) in $\boxplus\ \boldsymbol{p}_r(i, j)$. Accordingly, points of the grid that more closely match the measurement(s) can be increased in rank. Conversely, points that do not closely match the measurement can have their rank decreased. According to some examples disclosed herein, when a point of the grid does not match the measurement (e.g., the point of the grid does not match the measurement several times in a row because it is likely not the vehicle 100 location), the rank of that specific point becomes critically and/or significantly low and is moved out of an area of possible solutions (AoPS) and, as a result, can be culled and/or removed from the grid. Thus, a computational overhead associated with the PMF can be significantly reduced by reducing tracking of non-feasible solutions (e.g., non-feasible positions), thereby enabling reduced power consumption, which can be particularly advantageous for UAV/UAS implementations/applications. Based on a series of multiple measurements that match, examples disclosed herein can shrink and/or reduce a size of the grid to a relatively smaller area surrounding the location of the vehicle 100 with the actual location generally aligned with the peak value of $\boxplus\ \boldsymbol{p}_r(i, j)$.

At block 210, in the illustrated example of FIG. 2, a point of the grid corresponding to the highest probability (denoted by the highest rank in $\boxplus\ \boldsymbol{p}_r(i, j)$) is determined and/or identified. According to examples disclosed herein, the point of the grid corresponding to the highest probability is assumed and/or estimated to be a position/location of the vehicle 100.

At block 212, a position of the vehicle 100 is estimated and/or calculated, and the process ends. According to some examples disclosed herein, the position of the vehicle 100 is estimated and/or calculated to guide movement of the vehicle 100 (e.g., in the absence of GNSS signals, in the absence of available terrain data/information, etc.).

Figure 3:
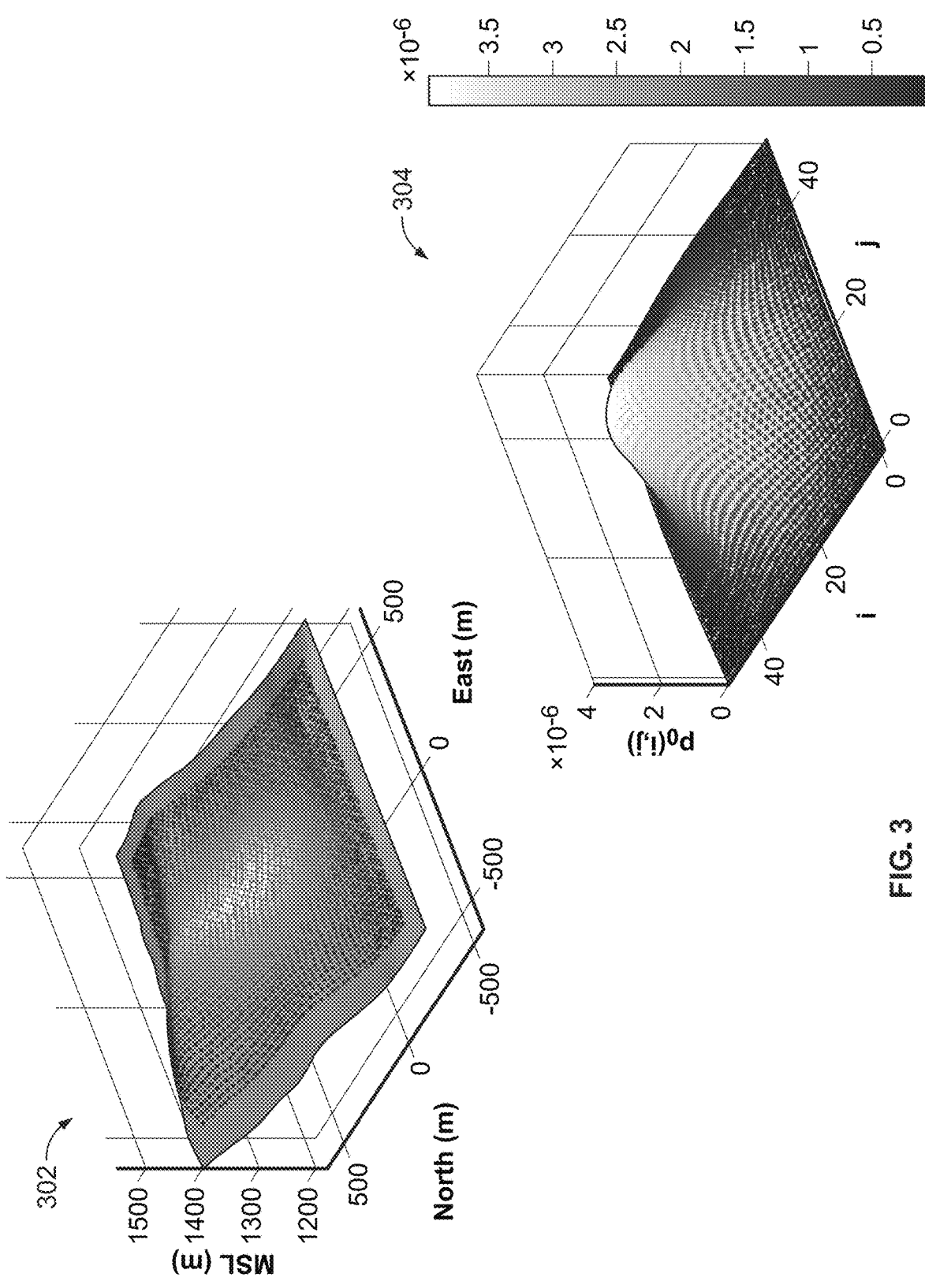
FIG. 3 depicts graphs corresponding to a point mass filter (PMF) that can be implemented in examples disclosed herein.

FIG. 3 depicts graphs 302, 304 corresponding to a PMF that can be implemented in examples disclosed herein. In the illustrated example of FIG. 3, the graph 302 corresponds to a grid of possible solutions corresponding to the location of the vehicle 100 (e.g., a probabilistic grid of potential location positions of the vehicle 100). The example graph 304 corresponds to probabilities of points of the grid matching the location of the vehicle described herein as $\boxplus\ \boldsymbol{p}_r(i, j)$.

According to examples disclosed herein, the PMF tracks, represents and/or corresponds to a two-dimensional (2D) grid of points, $\mathbb{G}$. In particular, each point of the grid is a possible/potential location of the vehicle 100. According to examples disclosed herein, the overall grid bounds an estimate of where a solution of the location may be, such that the actual/true location of the vehicle 100 is within the grid. Otherwise, an algorithm utilizing a PMF can fail. The example graph 302 shows a grid of possible locations of the vehicle 100, $x_r(i,j)$.

According to examples disclosed herein, each point of the grid is assigned a rating and/or value corresponding to a likelihood that the point is the correct solution, and the PMF is utilized to provide the location of the point with the highest value as its estimate of the position of the vehicle 100. In this example, $\boxplus\ \boldsymbol{p}_r(i, j)$, is implemented as a matrix and/or an array that stores each of values/scores/ratings of points therein. For visualization of $\boxplus\ \boldsymbol{p}_r$, the example graph 302 of FIG. 3 indicates the probability of each point in $\mathbb{G}$ being the solution with lighter portions indicating a most likely solutions while darker portions indicate least likely solutions. Further, the aforementioned example graph 304 represents the data of the graph 302 as a surface and/or contour where heights and shading correspond to a probability of a specific point being the solution. Accordingly, in some examples, the absolute values in $\overset{\boxplus}{p}_t$ are not relevant, and the relative values are, instead, relevant. Typically, $\overset{\boxplus}{p}_t$ is normalized with the maximum value=1, or the sum of all the points=1.

Figures 4A, 4B:
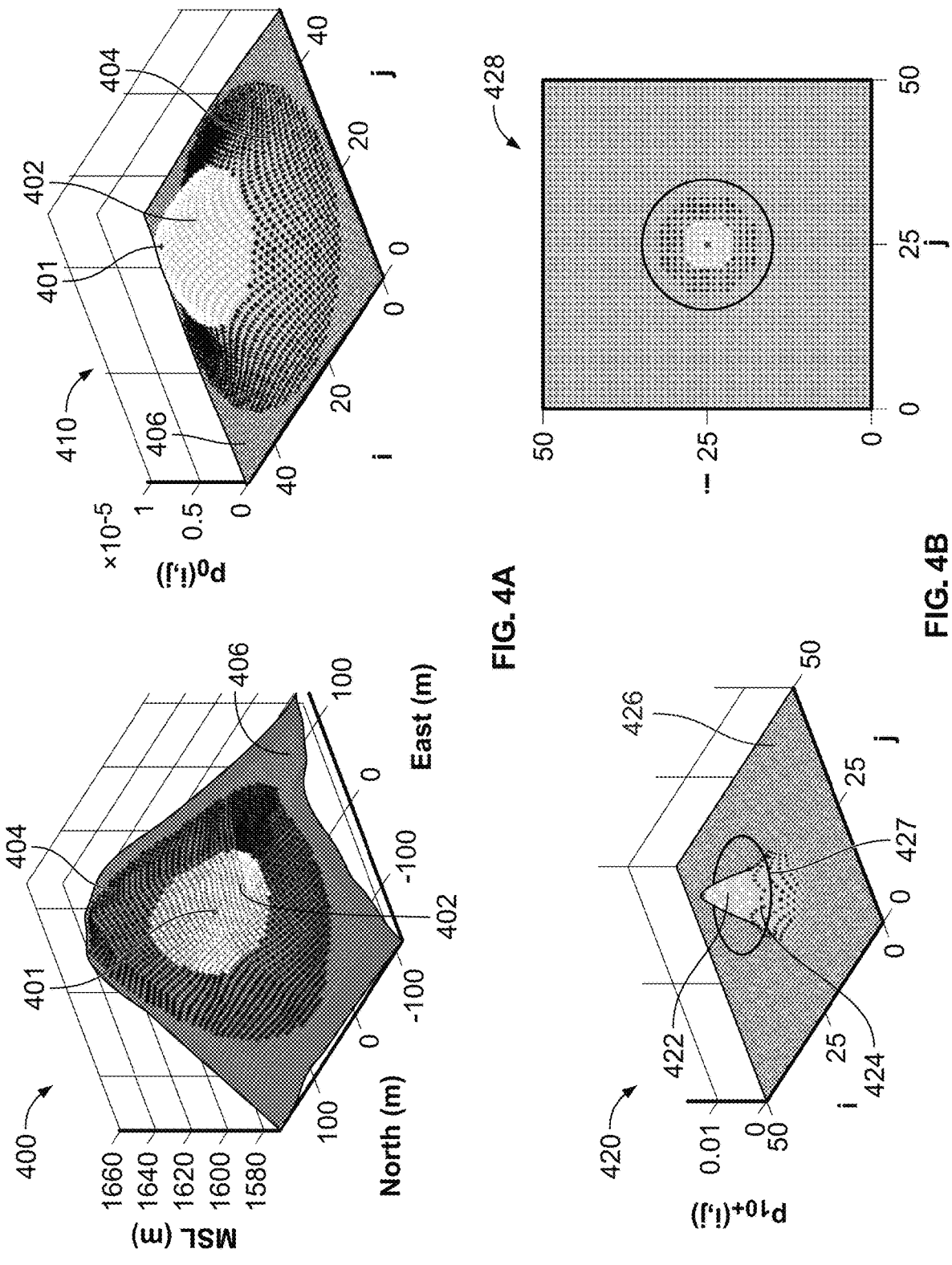
FIGS. 4A-4G depict example aspects of calculations of examples disclosed herein.

FIGS. 4A-4G depict example aspects of calculations of examples disclosed herein. Turning to FIG. 4A, an example elevation grid 400 is shown with a center 401, and an area of likely solutions (AoLS) 402. In the illustrated example of FIG. 4A, the AoLS 402 is a generally (e.g., loosely) defined area within the grid $\mathbb{G}$ where the vehicle 100 is likely to be located. In some examples, if $\overset{\boxplus}{p}_t(i, j)$ appears and/or approximates to a Gaussian normal, then the AoLS 402 could be regarded as all of the points within 1 standard deviation away from a peak, for example. Additionally or alternatively, the AoLS 402 may be defined as an area where values of individual points are within 60% of the maximum value. A second example area is the Area of Possible Solutions (AoPS) 404 that is also depicted in FIG. 4A. In this example, the AoPS 404 can be defined with points of the grid between 5% and 60% of the maximum value of $\overset{\boxplus}{p}_t(i, j)$. Thus, the AoPS 404 can correspond to, denote and/or mark an area where the vehicle 100 may be, but is not likely to be. In this example, a region 406 corresponds to a possible area of the vehicle 100 (e.g., a possible area with a low likelihood of being a location of the vehicle 100).

According to the illustrated example of FIG. 4A, remaining points of the grid have values less than 5% of the maximum value. According to examples disclosed herein, these remaining points can be culled and/or discarded from the grid, thereby reducing computational times and/or resources. In other words, boundaries of the grid may be adjusted as the points are culled from the grid. The aforementioned boundaries might not be significant and values outside of the AoPS 404 and/or the AoLS 402 may be culled from the grid. In some examples, the boundaries and/or the remaining points can be utilized for visualization of points corresponding to the location of where the vehicle 100 is likely to be (e.g., within one standard deviation of the peak).

Examples disclosed herein can maintain the location of the vehicle 100 within the AoLS 402, even when the vehicle 100 is in flight over areas of flat or reduced detail terrain, and enable the location of the vehicle 100 remaining within the AoPS 404. Otherwise, the solution can walk off of the grid and, thus, can end up lost to the filter. As shown herein, the AoLS 402 and AoPS 404 is depicted in generally white and black color, respectively. Areas surrounding the AoPS 404 in the aforementioned region 406 include points that can be eligible for being culled from the grid. In the illustrated example of FIG. 4A, the elevation grid 400 depicts $\overset{\boxplus}{p}_t(i, j)$ overlaid on the terrain, and a height plot 410 also depicts the AoLS 402, the AoPS 404 and the aforementioned region 406. In this example, the aforementioned center 401 corresponds to an actual location of the vehicle 100 (depicted as a dot). According to examples disclosed herein, utilizing a PMF consists of two main steps: (i) a time propagation step and (ii) a measurement step. In the example measurement step, the grid is refined based on information obtained from the terrain measurements. In the time propagation step, the grid is refined based on an estimate of the change in position of the vehicle 100 between measurements and/or measurement steps.

According to examples disclosed herein, the aforementioned time propagation step described above can serve two purposes, amongst other purposes. A first purpose is that the time propagation step moves the aforementioned grid, $\mathbb{G}$, by a product of an estimated (or measured) velocity, $\hat{v}_t$, multiplied by an amount of time between measurements, and $\Delta t$ (e.g., by the estimated change in position between measurements, $\Delta \hat{x}_{t+\Delta t,t}$). In regard to a second purpose, examples disclosed herein adjust $\overset{\boxplus}{p}_t$ via smoothing and expanding the grid to account for errors in the estimated velocity.

As mentioned above, the grid is moved. For example, at each timestep, the grid is moved by an estimate of the change in position between timesteps. This can be accomplished by multiplying the measured velocity by the change in time, as seen in example Equation 1 below:

$$\hat{x}_{t+\Delta t} = \hat{x}_t + \Delta \hat{x}_{t+\Delta t,t} = \hat{x}_t + \Delta t(\hat{v}_t) = \hat{x}_t + \Delta t(\vec{v}_t + \vec{w}_{\hat{v}}) \tag{1}$$

$$\vec{w}_{\hat{v}} \sim \mathcal{N}(0, \sigma_{\hat{v}}^2),$$

where the velocity measurement is modeled as having a zero-mean, uncorrelated, with a Gaussian white noise error.

Known utilizations of the PMF expand the grid $\mathbb{G}$. In particular, the PMF is utilized to identify which point in the grid is aligned with the location of the vehicle 100. Accordingly, when there is a threshold degree of error in the velocity measurement, the point aligned with the location can be changed. This can be visualized as the location of the vehicle 100 moving around the grid (even though both the grid and the location are moving in time). A PMF algorithm/implementation takes into account that the location may have moved within the grid. Accordingly, points in the grid values, $\overset{\boxplus}{p}_t$, are smoothed out between measurement steps using an a priori estimate of a standard deviation of the velocity error, $$\sigma_{\hat{v}}^2.$$

As a result of smoothing, peak values can be reduced while surrounding values are increased. Assuming that a grid point that is aligned with the location of the vehicle 100 has the highest value in $\overset{\boxplus}{p}_t$, during a smoothing step, a value of the grid point will decrease and values of neighboring points will increase. This adjustment of values takes into account velocity error. Due to the velocity error, an actual solution may have moved to be aligned with at least one neighboring grid point. In other words, a probability of a peak value decreases and, conversely, neighboring points increase in value. This smoothing can be accomplished by defining a 2D probability density function $p_v(\vec{e}_{\Delta \hat{x}})$ that corresponds to the probability that the error in the position change will be a distance of $\vec{e}_{\Delta \hat{x}}$. This probability density function is defined as shown below in connection with example Equation 2:

$$p_v(\vec{e}_{\Delta \vec{x}}) \sim \mathcal{N}(0, \Delta t^2 \sigma_{\vec{v}}^2) \tag{2}$$

$$\sigma_{\vec{v}}^2 = \begin{bmatrix} \sigma_v^2 & 0 \\ 0 & \sigma_v^2 \end{bmatrix},$$

where $$\sigma_{\vec{v}}^2.$$

is derived from example Equation 1. In this example, the PDF is discretized onto a grid $\overset{\boxplus}{w}(k, l)$, over a set of points $\mathbb{H}$ having the same or similar spacing between the points of the main grid, $\Delta \mathbb{G}$ to yield example Equation 3 below:

$$\overset{\boxplus}{w}(k, l) \sim \mathcal{N}(0, \Delta t^2 \sigma_v^2) \forall \mathbb{H} \tag{3}$$

$$\mathbb{H} = \{(k, l) : (k, l) \in \mathbb{I}^2, |k| \le n_h, |l| \le n_h\}$$

$$\text{where } n_h = \left\lceil \frac{n \sigma_v \Delta t}{\Delta G} \right\rceil$$

In this example, $n_h$ is a value that corresponds to the size of $\mathbb{H}$, $((2n_h+1) \times (2n_h+1))$, and, $n_h$ corresponds to a number of points that the grid $\mathbb{G}$ will grow over, during and/or between each timestep. In this example, the notation corresponding to $\lceil \ldots \rceil$ refers to the next largest integer, or ceiling function. This can be expanded out to example Equation 4:

$$\overset{\boxplus}{w}(k, l) = \frac{1}{2 \pi \Delta t^2 \sigma_v^2} e^{-\frac{\Delta G^2 (k^2 + l^2)}{2 \Delta t^2 \sigma_v^2}} \tag{4}$$

$$k = -n_h, \ldots, -1, 0, 1, \ldots, n_h \text{ and } l = -n_h, \ldots, -1, 0, 1, \ldots, n_h,$$

where $\Delta \mathbb{G}$ is the spacing between the grid points in $\mathbb{G}$ and $\mathbb{H}$. In this example, $\overset{\boxplus}{w}(k, l)$ is a discrete, truncated, zero-mean, 2D, normal probability density function created with the same or similar spacing as the grid $\mathbb{G}$. According to examples disclosed herein, an error PDF is truncated n standard deviations away, typically on the order of 2 or 3 standard deviations, for example. Artificially increasing n higher and, thus, expanding the grid at a faster rate, will not be generally beneficial since these points will have a near zero value, and will be immediately culled. According to examples disclosed herein, an AoLS/AoPS is expanded, in contrast to expanding the grid with points having near zero values. Also, with a larger n, the size of $\mathbb{H}$ increases, thereby causing the overall algorithm to run at a slower rate as a subsequent step is a significant driver on the time it takes to perform the PMF algorithm. Accordingly, the PMF algorithm incorporates this error in the velocity measurement into $\overset{\boxplus}{p}_{t+\Delta t}(i, j)$ by convoluting $\overset{\boxplus}{p}_{t+\Delta t}(i, j)$ with $\overset{\boxplus}{w}(k, l)$ as shown in example Equation 5 below:

$$\overset{\boxplus}{p}_{t+\Delta t}(i, j) = \overset{\boxplus}{p}_t(i, j) \circledast \overset{\boxplus}{w}(k, l) \tag{5}$$

As a result, the grid is smoothed and expanded, thereby causing the grid to act similar to a Gaussian blur on an image. In particular, peaks of high values are distributed to neighboring grid points.

A non-zero bias error, as assumed in known implementations, can result in numerous issues. As mentioned above in the context of a PMF implementation, a goal of utilizing a PMF is to have a grid point in $\mathbb{G}$ that is generally aligned with the location of the vehicle 100 having the highest value in $\overset{\boxplus}{p}_t$. This can be accomplished primarily during a measurement step. When the vehicle 100 is in flight over terrain having a significant amount of information (e.g., based on hilly terrain or numerous landmarks), many of the points in $\mathbb{G}$ will have a ground elevation that is not relatively close to the measured elevation. In particular, these points will have their corresponding values in $\overset{\boxplus}{p}_t$ decreased, while points near the correct elevation will have associated values that are increased. In turn, an overall effect is that points near the location of the vehicle 100 are elevated, and other points are reduced in value (e.g., pushed down). If the location point of the vehicle 100 moves within the grid due to errors in the velocity estimate, $\vec{w}_{\vec{v}}$, examples disclosed herein can follow the vehicle 100 by, at each new measurement step, elevating values of new grid points that are near the location and of the vehicle 100, and reducing (e.g., pushing down) values of points that are no longer near the location of the vehicle 100. As a result, a race between an ability of the algorithm to elevate a true point to the maximum value, and the location of the vehicle 100 moving to a different point is created. As mentioned above, this movement of the true point can be due to the error in the velocity estimate, $\vec{w}_{\vec{v}}$. However, in reality, the true solution does not move within the grid. Instead, errors in the velocity estimate, $\vec{w}_{\vec{v}}$, can cause the grid to be moved incorrectly, and not at the same speed and direction as the location of the vehicle 100. Thus, the location of the vehicle 100 can appear to be moving within the grid. During periods where there is a low amount of information (e.g., the vehicle 100 is in flight over flat ground), the measurement step is not able to reduce values (e.g., push down) incorrect points, and elevate a value of the grid point aligned with the correct solution. In turn, $\overset{\boxplus}{p}_t$ remains unchanged and, thus, the peak point in $\overset{\boxplus}{p}_t$ no longer corresponds to the location of the vehicle 100. The PMF can account for this loss of accuracy by pushing down high peaks and distributing their value to neighboring points. In some examples, the PMF can smooth out the peaks in $\overset{\boxplus}{p}_t$ and, in effect, respond to reduced confidence corresponding to the location of the vehicle 100. If such an effect persists for a requisite amount of time, the location of the vehicle 100 can leave the grid (e.g., walk off the grid). As a result, determination of the location of the vehicle 100 can fail and/or become unrecoverable. To mitigate such an adverse result, the PMF can be utilized to attempt to keep the location of the vehicle 100 within the grid by expanding the grid during the time propagation step, for example. Essentially, in the aforementioned race between the ability of the algorithm to elevate the true point to the maximum value and the tendency of the true point to wander around the grid, the algorithm can expand (e.g., artificially expand) the grid and elevate the points where the true point may have wandered to (e.g., the points are not culled). In contrast to reduced information (e.g., smooth terrain), with increased measurement information returns (e.g., flying over hilly terrain), the algorithm can quickly elevate values of points of the grid corresponding to the location of the vehicle 100, and shrink values of points of the grid that are around the location. An issue with known implementations that vary the size of the grid is that known implementations are unable to expand the grid in a quick manner to ensure that the location of the vehicle 100 cannot walk off the grid when periods of low information are encountered.

Some known systems utilize non-linear expansion of the AoLS 402. In particular, known PMF algorithms assume that $\vec{w}_{\tilde{v}}$ is non-correlated, zero-mean, Gaussian noise. Assuming this to be true, the position of the vehicle 100 can wander around in a random pattern called a Gaussian Random Walk. In particular, the location of the vehicle 100 can move in a random direction on the grid with a step of $\Delta t$ $\vec{w}_{\tilde{v}}$. Accordingly, the distance, $\vec{d}_n$ that the location of the vehicle 100 moves after n steps is a random variable with the following statistics according to Example Equation 6:

$$\vec{d}_n = \sum_n \Delta t \, \vec{w}_{\tilde{v}} \tag{6}$$

$$\vec{d}_n \sim \mathcal{N}\left(0, \, n\left(\Delta t \sigma_{\tilde{v}}\right)^2\right)$$

$$E|\vec{d}_n| = 0$$

$$\sqrt{E|\vec{d}_n|^2} = \Delta t \sigma_{\tilde{v}} \sqrt{n}$$

As can be seen in example Equation 6, in known implementations, the grid is expanded at the same rate that the vehicle 100 may wander away, assuming a random walk. In particular, the algorithm of known implementations can expand the grid at a rate corresponding to the square root of time. This known methodology may work with a non-zero mean error in the velocity estimate. As described by Bergman, to compensate for the bias error, $\tilde{\sigma}_v$ is artificially increased slightly, and the PMF then utilizes the elevation measurement information to drive down grid points that are not aligned with the location of the vehicle 100 in a relatively quick manner, and drive up the points aligned with the location. In other words, this algorithm can successfully follow the location by elevating the points aligned with the location of the vehicle 100. Additionally, following the location combined with convolution can maintain the location within an AoLS and, thus, the grid.

Examples disclosed herein can be utilized advantageously in areas (e.g., flat terrain) with low information, as well as bias error in velocity estimates. In contrast, known systems can have difficulty with such conditions. Depending on where the vehicle 100 is flying, it can be very likely that periods of low information will occur. For some UASs with low cost microelectronic mechanical systems (MEMs) IMUs, it is very likely that bias error will be present in the velocity estimate. In these scenarios, with known implementations, the PMF can fail when the solution walks off the grid. To mitigate such effects, the $\tilde{\sigma}_v$ can be increased significantly. In particular, a larger $\tilde{\sigma}_v$ results in a grid $\mathbb{G}$ that expands faster. (See Equation 6). However, because the grid expands as a function of the square root of time, the amount of increase depends on how long the vehicle 100 will fly over an area of low information. In particular, with a longer amount of time in the area of low information, the value of $\sim\tilde{\sigma}_v$ increases. As a result of the larger $\tilde{\sigma}_v$, the filter is less accurate as $\tilde{\sigma}_v$ essentially removes information from $\overset{\boxplus}{p}_t$ by over-smoothing. Therefore, there can be a tradeoff between tolerating a longer period of low-information, and filter accuracy. Accordingly, based on a duration of the vehicle 100 flying over an area of low information, the following example Equation 7 can be implemented to ensure that the location of the vehicle 100 remains within the grid:

$$\tilde{\sigma}_v > \sqrt{n} \, |\tilde{e}_{\tilde{v}}^{max}|, \tag{7}$$

where n is the number of filter iterations, and $$\tilde{e}_{\tilde{v}}^{max}$$

is the maximum expected velocity error.

In certain scenarios, an issue with the vehicle 100 being in flight over an area with low information is that it is not always possible to have knowledge of a size of the area a priori. Therefore, in known implementations, it can be difficult to increase a size of the grid quickly enough for areas with low information. Therefore, $\tilde{\sigma}_v$ has to be set to be large without ensuring that it is large enough. To that end, examples disclosed herein present an alternative such that the velocity error is not assumed to be zero mean.

FIG. 4B depicts an example grid 420 after 10 iterations. As mentioned above, an AoLS 422 can be expanded non-linearly. For example, some example assumptions correspond to the following: an initial position of the vehicle 100 is known and located at the center of the grid $\mathbb{G}$, and/or the center point of $\overset{\boxplus}{p}$ has a value of 1, with the remaining points having a value of approximately zero. Also assuming that there is little to no measurement information (e.g., the vehicle 100 is flying over a significantly flat area), it can be assumed that the maximum velocity error is $$|\tilde{e}_{\tilde{v}}^{max}| = 1 \text{ m/s}.$$

Also for simplicity, it can be assumed that $\Delta \mathbb{G} = 1$ m and $\Delta t = 1$ s. In choosing the parameters for $\overset{\boxplus}{w}$, the estimate of the standard deviation of the velocity errors can be defined as $$\tilde{\sigma}_v = |\tilde{e}_{\tilde{v}}^{max}| = 1 \text{ m/s}.$$

Ideally, a true solution remains within the AoLS 422, and the solution must at least remain within an AoPS 424. If the solution enters the area corresponding to a region 426, then the corresponding points may be culled, for example. In this example, a top/elevation view 428 of the grid 420 is also shown.

In this example, after 10 iterations, the AoLS 422 has a radius of approximately 3 meters (m) to 4 m, and the AoPS 424 has a radius of approximately 8 m. However, the vehicle 100 could be anywhere within a 10 m radius shown by a line 427, for example. Thus, there is a risk that the vehicle 100 has exceeded a boundary of the grid. Again, the filter designer could artificially increase $\tilde{\sigma}_v$ at the expense of accuracy. However, there can be a length of time where a distance that the vehicle 100 could travel will exceed the AoLS 422 and/or the AoPS 424.

As can be seen in FIGS. 4A and 4B, the PMF assumption that the velocity error as zero-mean causes significant challenges for grid-based determination of a location of the vehicle 100. The presence of any bias error in the velocity measurement may necessitate a guess and/or estimation with regard to sizing $\tilde{\sigma}_v$ without a guarantee that $\tilde{\sigma}_v$ is sufficiently large. According to examples disclosed herein, the PMF can be reformulated to assume any type of velocity error as long as it is limited within a certain range with little or no impact to filter performance.

Further, with respect to the convolution step, convoluting $\overset{\boxplus}{p}_n$ with $\overset{\boxplus}{w}$ artificially brings down high values within $\overset{\boxplus}{p}_n$ that have narrow support. As used herein, the term "narrow support" refers to a relatively long and thin area in $\overset{\boxplus}{p}_r$. A relatively long and thin area may be a result of the vehicle 100 flying along a valley or hill. The relatively long and thin area can also occur when approaching a wide hill. Further, if there are areas within the grid that are more generally circular, some algorithms will disproportionally favor the circular regions. This is due to the fact that when $\overset{\boxplus}{p_r}$ is convoluted with $\overset{\boxplus}{w}$, it disproportionally diminishes narrow regions. This result is not unexpected considering that convolution can act similar to a Gaussian blur on an image. For example, a blurring process can smooth a line away, but only edges of a circle.

Figure 4C:
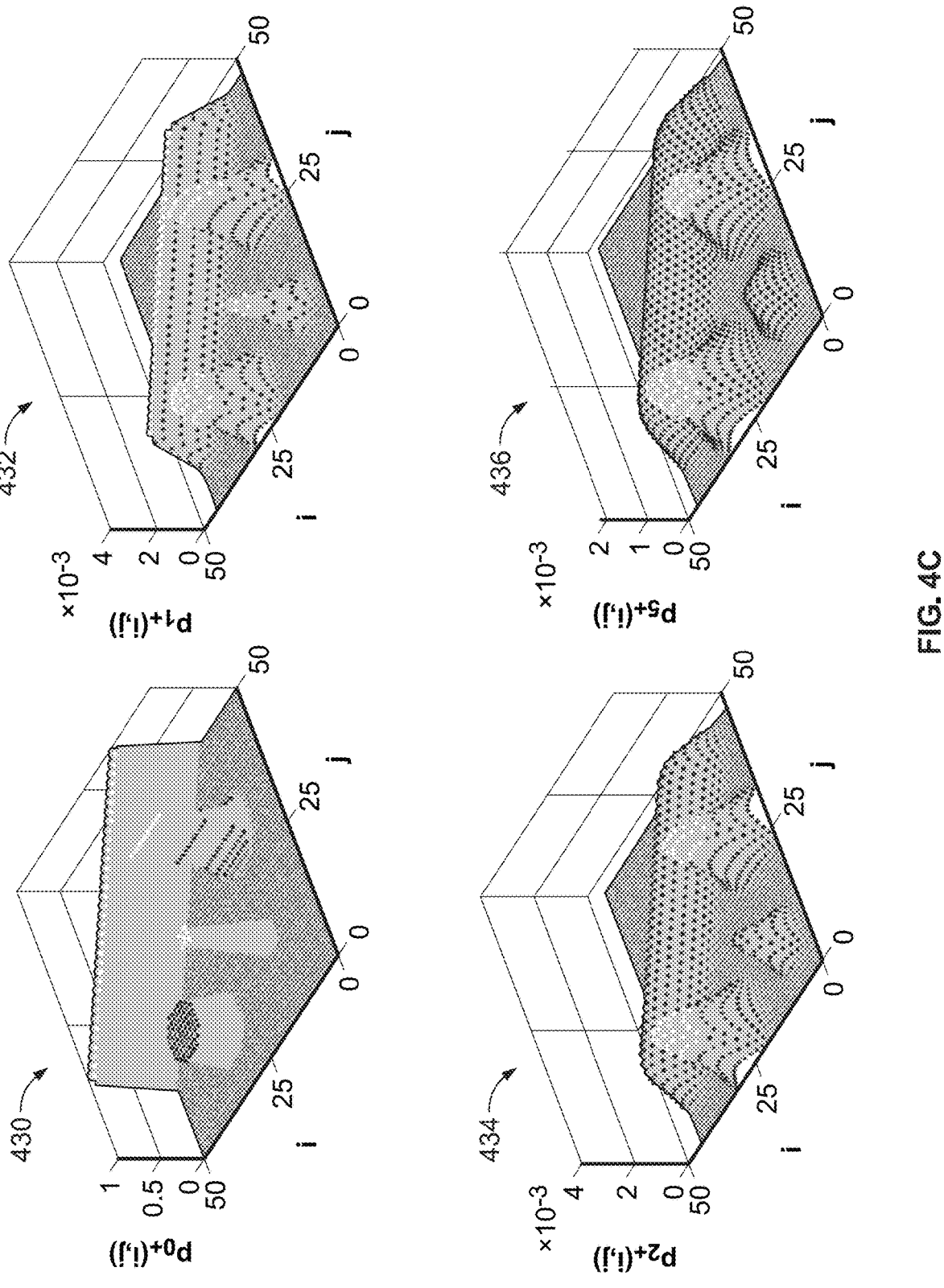

Turning to FIG. 4C, example graphs 430, 432, 434, 436 depict a known convolution process. The example graph 430 depicts an artificial $\overset{\boxplus}{p}$ having several different features including a small plateau, and two thin ridges, all with $$\overset{\boxplus}{p}_{(i,j)} = 1.$$

Further, in this example, a large plateau has a corresponding value of only $$\overset{\boxplus}{p}_{(i,j)} = 0.5.$$

As seen in the graph 434, after one convolution with $\overset{\boxplus}{w}$, the thin ridges and small plateau are at the same probability as the large plateau. After five iterations, the graph 436 depicts the large plateau having the highest feature, and the small plateau is all but removed.

As can be seen in the illustrated view of FIG. 4C, the points on the ridge and small plateaus correspond to the most likely points for the location of the vehicle 100. However, according to examples disclosed herein, if it is assumed that there is no measurement information for the five iterations, then the most likely points according to the algorithm have completely changed. Ideally, when there is no measurement information, the likelihood of the points remain generally unchanged. Accordingly, the convolution step can accurately change the relative probabilities. A relatively small plateau in the presence of velocity error will need to distribute its probability, and if the area under the PDF is integrated around the small plateau, it will remain relatively unchanged. However, the algorithm does not integrate areas to determine where the vehicle 100 is located. In contrast, examples disclosed herein can utilize a maximum value of the PDF. Ideally, the time propagation step should not change the maximum values of $\overset{\boxplus}{p}$. According to examples disclosed herein, the propagation step does not change the maximum values of $\overset{\boxplus}{p}$.

According to examples disclosed herein, an advantageous example method of expanding $\overset{\boxplus}{p}$ is linearly expanding $\overset{\boxplus}{p}$ with respect to time and without smoothing effects. For example, the grid may be expanded cylindrically. Assuming at t=0 that the position of the vehicle 100 is known and is located at the center of the grid $\mathbb{G}$, the center point has a value of 1, while the remaining points have a value of approximately zero, after one propagation step, a cylinder with a radius equal to the max velocity error, $$|\vec{e}_{\tilde{v}}^{\,max}|\,\Delta t,$$

is centered around a known initial solution (e.g., at t=0). The cylindrical area represents the bounded area in which the vehicle 100 could be located. If there is measurement information, the cylindrical grid will be decreased in areas that have an elevation that is not close to the UAV location, (and it will likely no longer be cylindrical). But if there is no measurement information (e.g., the vehicle 100 is flying over water), then the cylinder keeps growing outward linearly with at each time step at a rate of $$\vec{e}_{\tilde{v}}^{\,max}.$$

Figures 4D, 4E, 4F:
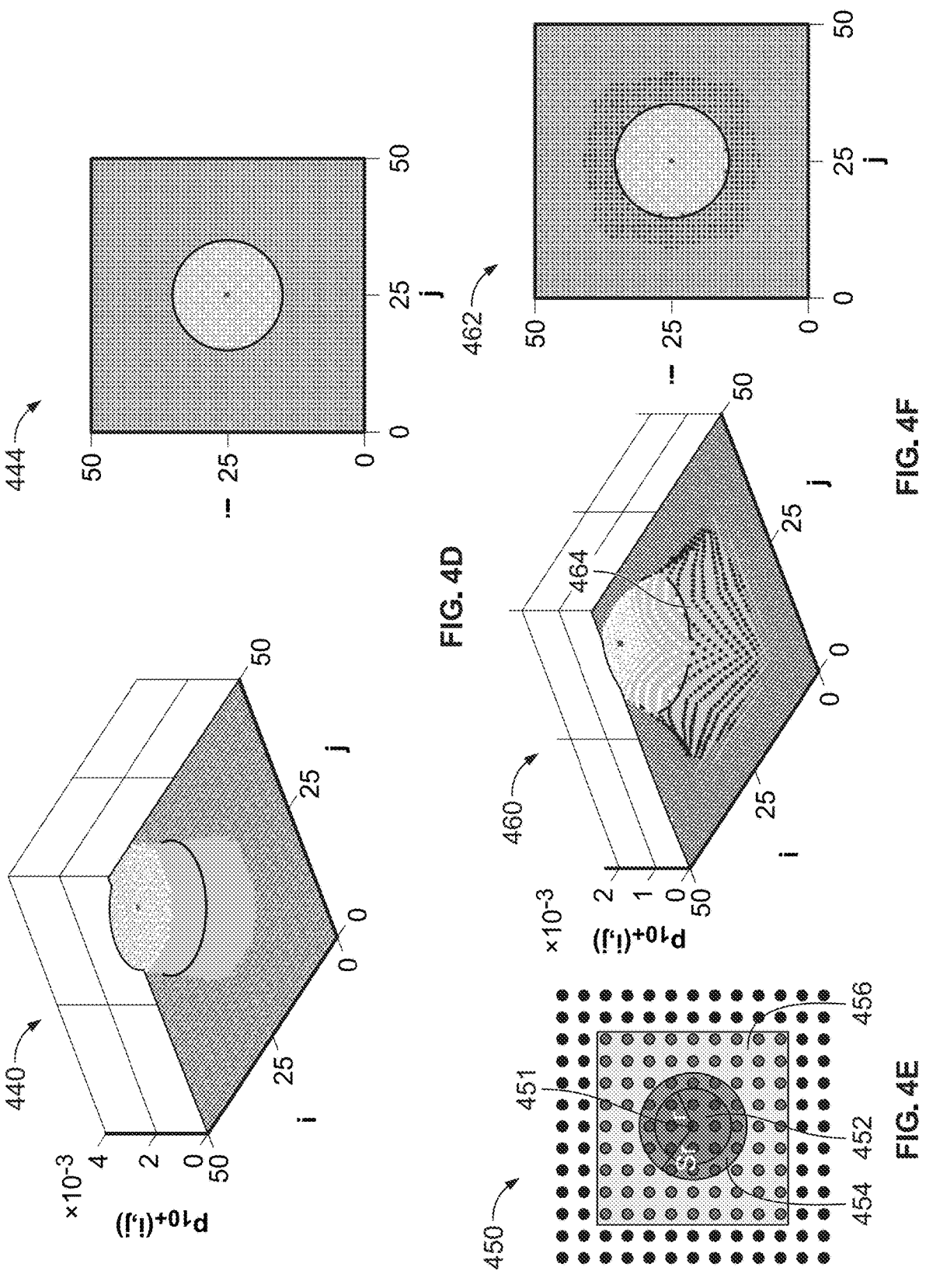

FIG. 4D represents an example expansion of a grid 440 that can be implemented in examples disclosed herein. The example grid 440 is also depicted as an overhead view 444. It should be noted that there can be challenges to implementing an expansion of the grid. In particular, a recursive process that does not require any more information storage is utilized. Further, this example methodology can limit methods that could be implemented. Additionally, a maximum velocity estimation error might not be an integer multiple of the grid spacing, or the maximum velocity estimation error may be smaller than the grid spacing. Such a mismatch in spacing can cause issues with the timestep and the grid being discrete. For example, taking half steps without recording additional data can be disadvantageous. Moreover, because discrete points are being utilized, it can be difficult to have a truly circular expansion, especially when the grid spacing is large compared to the error. Finally, a flat surface having the same maximum value, as shown in the grid 440 of FIG. 4D, might not be effective with a methodology utilizing a maximum value in $\overset{\boxplus}{p}$ as the estimate of the location of the vehicle 100 (See Equation 8 below). The location of the vehicle 100 can move to (e.g., jump around to) any of the points in the grid.

Examples disclosed herein can effectively approximate a cylindrical expansion. In particular, an AoLS can be linearly expanded. Examples disclosed herein can expand $\overset{\boxplus}{p}$ linearly outward at a rate of $$|\vec{e}_{\tilde{v}}^{\,max}|,$$

15 for example. Accordingly, the expansion can be accomplished by, at each timestep, having each point in the grid look at all of the points within a distance of $$r = |\dot{z}_{\dot{v}}^{max}| \Delta t$$

away and can set its value to the maximum value found within the radius, as can be seen in example Equation 8 below:

$$\overline{p}_{t+\Delta t}(i, j) = \overline{p}_t(i, j) + \max_{k,l}\left(\overline{p}_t(i+k, j+l) - \overline{p}_t(i, j)\right) \quad (8)$$

$$\text{where } \sqrt{k^2 + l^2} < \left\lfloor \frac{r}{\Delta G} \right\rfloor$$

$$\text{and } r = |\dot{z}_{\dot{v}}^{max}| \Delta t$$

According to examples disclosed herein, the symbol $\lfloor \rfloor$ refers to a floor function. Note that $$\left\lfloor \frac{r}{\Delta G} \right\rfloor$$

corresponds to a maximum distance to look/search in units of grid points. As long as $r >> \Delta G$, this results in the example idealized example cylindrical grid shown in FIG. 4D. However, in some cases, r may not be larger than $\Delta G$. In these cases, examples disclosed herein can create and/or define a diamond pattern. It is also very likely that r is smaller than $\Delta G$. In such a case, an algorithm may break down because of a lack of ability to look within a radius of less than 1 grid point away. Another potential issue is that the above relationship can create and/or define a relatively flat-topped surface which, as mentioned above, can be relatively difficult to analyze when using the maximum value to determine the final estimated solution. Accordingly, a variation to the algorithm that would produce a cylindrical grid that had a rounded top has been developed. Example methodology is accordingly disclosed below.

Examples disclosed herein can utilize a smoothing factor. Assuming s to be a smoothing factor where $(s\geq 1)$, s defines a degree of smoothing the edges of the cylinder and round the top, for example. Accordingly, s=1 corresponds to an idealized cylinder. Further, larger values of s result in a more rounded corner cylinder with a more domed top. The example algorithm works by looking a distance (s r) away to find a maximum value. However, instead of utilizing a maximum value, the example algorithm only utilizes a portion of the maximum value. For convenience, w may be defined to be a weighting factor where w=1/s. The example algorithm includes a difference between a maximum found value and a current point multiplied by the weighting factor. For example, if s=2, w=½, the example algorithm looks twice as far away, but only uses one half of the difference. If s=4, w=¼, then the example algorithm looks four times as far away, but only uses one quarter of the difference. Example equation 9 illustrates smoothing according to examples disclosed herein:

$$\overline{p}_{t+\Delta t}(i, j) = \overline{p}_t(i, j) + \max_{k,l}\left(w\left(\overline{p}_t(i+k, j+l) - \overline{p}_t(i, j)\right)\right) \quad (9)$$

16

-continued $$\text{where } \sqrt{k^2 + l^2} < \left\lfloor \frac{sr}{\Delta G} \right\rfloor$$

$$\text{where } w = \frac{1}{s} \text{ and } s \geq 1$$

$$\text{and } r = |\dot{z}_{\dot{v}}^{max}| \Delta t$$

An advantageous aspect of the example algorithm is that the AoLS (with values of at least 0.5-0.6 times the maximum grid value) can expand at a rate of $$|\dot{z}_{\dot{v}}^{max}|$$

regardless of the choice of s. This enables control of the amount of smoothing to the cylinder without significantly affecting the rate of expansion. In practice, values of w≈0.8 appear to work well. However, in some situations, values of w≈0.8 have not been shown to effectively expand the local search area since s≈1.25, and the distance is $$\frac{sr}{\Delta G}.$$

Often, (s r)<$\Delta G$ can correspond to less than one grid point away, which can necessitate another modification. Assuming $\mathbb{H}$ to be a subset of points within $\mathbb{G}$ that the algorithm will search, $\mathbb{H}$ will include all of the points within a circle of radius (s r), but $\mathbb{H}$ can also include additional points outside of the radius. In some examples, a goal is to include enough points such that a resulting expanding grid is roughly circular (e.g., too few points results in a diamond shape), but not an excessive amount points to be computationally expensive. $\mathbb{H}$ is typically square due to the fact that matrices are used, and a typical size of $\mathbb{H}$ is typically approximately 5×5 points. According to examples disclosed herein, points outside of the circle with radius (s r) are included in the algorithm, but may have an additional weighting based on their distance from the point. The weighting may be the inverse of their distance from a center point. Points within the circle of radius (s r) continue to have the same weighting as above. The algorithm finds the maximum value of all of these weighted points. As a result, the AoLS continues to advantageously expand at a desired rate, regardless of a size of H, and regardless of the value of s according to example Equation 10:

$$\overline{p}_{t+\Delta t}(i, j) = \overline{p}_t(i, j) + \max_{k,l\in\mathbb{H}}\left(w(k, l)\left(\overline{p}_t(i+k, j+l) - \overline{p}_t(i, j)\right)\right) \quad (10)$$

$$\text{where } w(k, l) = \begin{cases} \dfrac{r}{\sqrt{k^2+l^2}\,\Delta G} & \sqrt{k^2+l^2}\,\Delta G \leq s\,r \\ \dfrac{1}{s} & \sqrt{k^2+l^2}\,\Delta G > s\,r \end{cases}$$

$$\text{and } r = |\dot{z}_{\dot{v}}^{max}| \Delta t$$

FIG. 4E shows an example grid 450 with distances around an arbitrarily chosen center point 451. In the illustrated example of FIG. 4E, a circle 452 with a radius r is depicted. The example circle 452 designates the area where the location the vehicle 100 could move to within one time step (assuming it was originally on the center point) based on the maximum error in the velocity estimate, $$\left| \vec{e}_{\vec{v}}^{\,max} \right|.$$

An example circle 454 has a radius (s r). The smoothed algorithm searches in both areas defined by the circles 452, 454. In this example, all of the points within these two areas defined by the circles 452, 454 have the same weighting applied to them, w=1/s. In the illustrated area of FIG. 4E, an area 456 corresponds to points within $\mathbb{H}$. While generally depicted in FIG. 4A as a square, which can be conducive to programming and/or coding, any other appropriate shape can be implemented instead. The points within the area 456 can be scaled based on their relative distance to the center point. Further, the example algorithm can find and/or determine the maximum weighted difference between each point and the center point 451 and the value of each point can be added to a value corresponding to the center point 451. According to examples disclosed herein, this process can be repeated for each point in the grid.

Turning to FIG. 4F, an example grid 460 is shown after five iterations. Further an overhead view 462 is shown. In this example, a matrix $\overset{\boxplus}{\boldsymbol{h}}_{n_h}$, which is defined over region $\mathbb{H}$, is created. The size of $$\overset{\boxplus}{h}_{n_h}$$

is $(2n_h+1)\times(2n_h+1)$. To ensure that the region $\mathbb{H}$ completely encompasses a circle 464 with radius s r, define $n_h$ as can be expressed by example Equation 11:

$$n_h \geq \left\lceil \frac{sr}{\Delta G} \right\rceil = \left\lceil \frac{s|\vec{e}_{\vec{v}}|\Delta t}{\Delta G} \right\rceil \tag{11}$$

In the particular example depicted in FIG. 4F, an $\overset{\boxplus}{\boldsymbol{h}}_2$ with w=0.5 is implemented.

According to examples disclosed herein, each value in $$\overset{\boxplus}{h}_{n_h}$$

is assigned with the associated weighting w for each point in $\mathbb{H}$, thereby yielding example Equation 12:

$$\overset{\boxplus}{h}_{n_h}(k, l) = w(k, l) \tag{12}$$

$$\text{where } w(k, l) = \begin{cases} \dfrac{r}{\sqrt{k^2+l^2}\,\Delta G} & \sqrt{k^2+l^2}\,\Delta G \leq s\,r \\[2mm] \dfrac{1}{s} & \sqrt{k^2+l^2}\,\Delta G > s\,r \end{cases}$$

$$\text{and } r = \left| \vec{e}_{\vec{v}}^{\,max} \right| \Delta t$$

Further, example Equation 10 can now be rewritten as example Equation 13:

$$\overset{\boxplus}{p}_{t+\Delta t}(i, j) = \overset{\boxplus}{p}_{t^+}(i, j) + \max_{k,l \in \mathbb{H}} \left( \left( \overset{\boxplus}{p}_{t^+}(i+k, j+l) - \overset{\boxplus}{p}_{t^+}(i, j) \right) * \overset{\boxplus}{h}_{n_h}(k, l) \right) \tag{13}$$

$$\mathbb{H} = \left\{ (k, l) : (k, l) \in \mathbb{I}^2, |k| < n_h, |l| < n_h \right\}$$

In this example, $$\overset{\boxplus}{h}_{n_h}$$

is generally constant and define $$\overset{\boxplus}{h}_{n_h}(s)$$

is defined by s, r and nh. Therefore, once those values have been chosen, then $$\overset{\boxplus}{h}_{n_h}$$

can be generated a priori. Referring to the example in FIG. 4B, where $$\left| \vec{e}_{\vec{v}}^{\,max} \right| = 1 \text{ m/s}, \Delta t = 1 \text{ s and s} = 1.25,$$

example Equation 14 can be defined as below:

$$\frac{sr}{\Delta G} = s\frac{|\vec{e}_{\vec{v}}|\Delta t}{\Delta G} = 1.25 \tag{14}$$

$$\therefore n_h = \left\lceil \frac{sr}{\Delta G} \right\rceil = \lceil 1.25 \rceil = 2$$

$$\overset{\boxplus}{h}_2 = \begin{bmatrix} 0.354 & 0.447 & 0.5 & 0.447 & 0.354 \\ 0.447 & 0.707 & 0.8 & 0.707 & 0.447 \\ 0.5 & 0.8 & 0.8 & 0.8 & 0.5 \\ 0.447 & 0.707 & 0.8 & 0.707 & 0.447 \\ 0.354 & 0.447 & 0.5 & 0.447 & 0.354 \end{bmatrix}$$

According to examples disclosed herein, the resulting AoLS expands linearly at roughly $$\left| \vec{e}_{\vec{v}}^{\,max} \right|.$$

According to examples disclosed herein, the AoLS is domed, which is highly effective for a maximum likelihood method. Accordingly, in practice, examples disclosed herein can be highly advantageous in location determination.

Figure 4G:
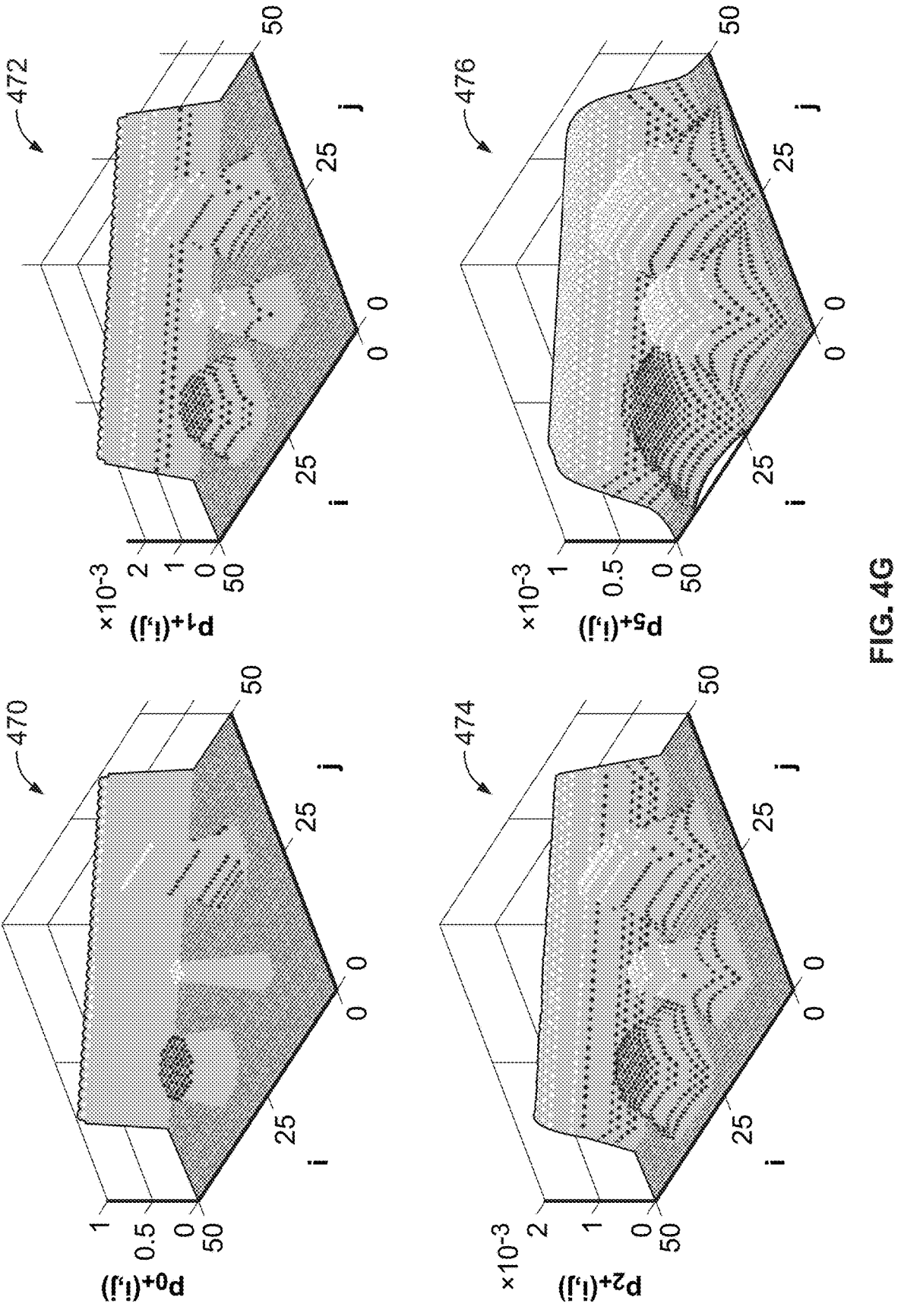

FIG. 4G depicts linearly expanding an AoLS according to examples disclosed herein with example graphs 470, 472, 474, 476. In this example, thinning of features is depicted. The example of FIG. 4G is shown in contrast to the example from FIG. 4C, where thin features were present inside of $\overset{\boxplus}{p}$. Using the new linearly expanding AoLS, relative heights of all of the features are maintained. In particular, the example of FIG. 4G does not artificially push down thinly supported features. As a result, accuracy of shapes are well retained in comparison to the example FIG. 4C.

Figures 5A, 5B:
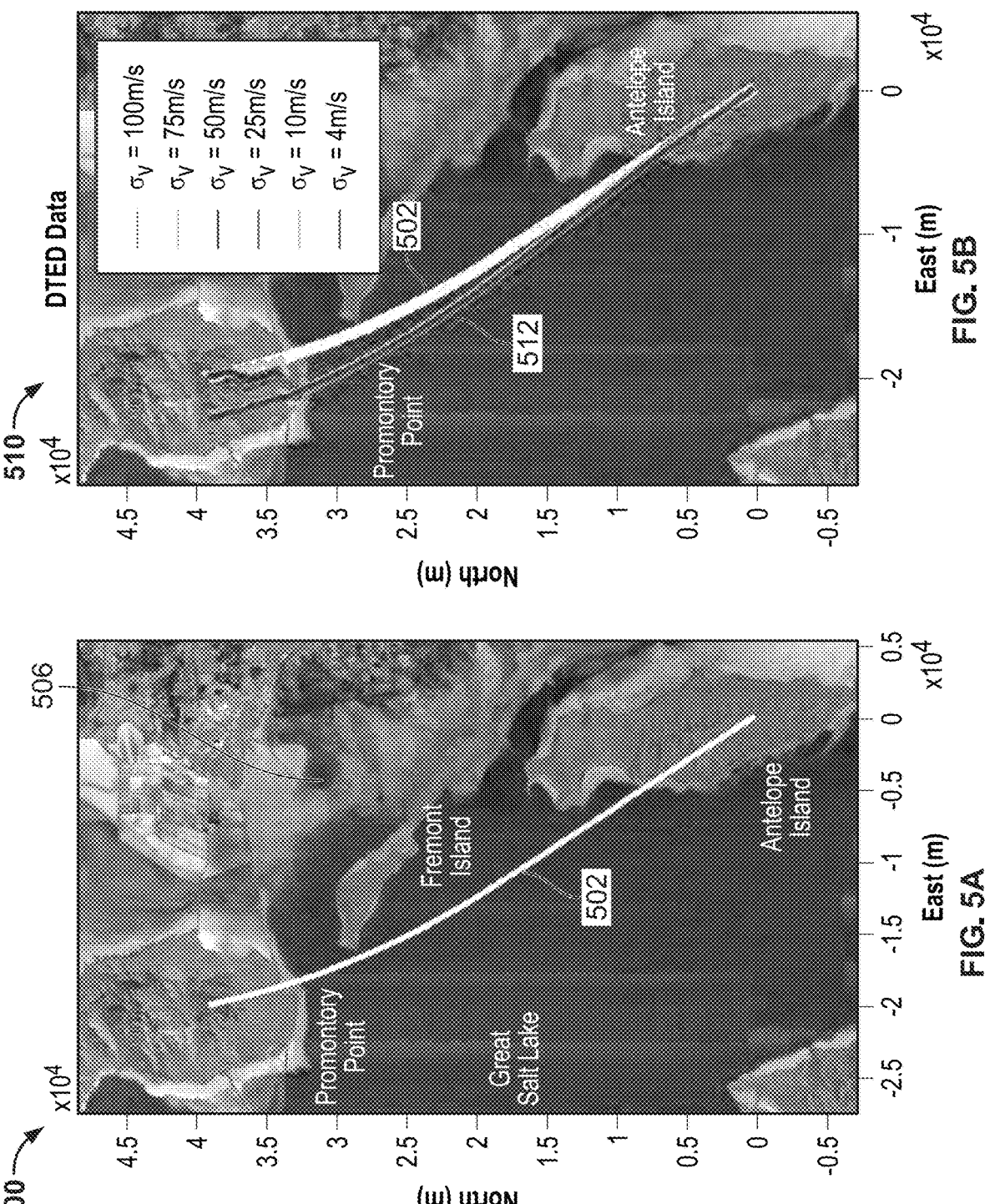

FIGS. 5A-5H depict aspects of example results corresponding to examples disclosed herein. Turning to FIG. 5A, an overhead view 500 with an example flight path 502 is shown. In the illustrated example of FIG. 5A, the vehicle 100 will fly from a first position on an island. In particular, the vehicle 100 will fly NNW over the island and then out. In this example, it assumed that there is a 3 m/s bias error in the velocity measurement pushing the grid West of where the grid should be located. This error can be caused by undetected wind changes, or heading misalignment, or any other bias error, as shown below in example Equation 15:

$$\vec{e}_{\hat{v}} = \begin{bmatrix} 0 \\ -3 \text{ m/s} \end{bmatrix} \qquad (15)$$

FIG. 5B depicts an overhead view 510 illustrating example PMF solutions for different values of $\tilde{\sigma}_v$. In the illustrated view of FIG. 5B, lighter regions and/or portions correspond to an actual location of the aforementioned vehicle 100 corresponding to the flight path 502. As can be seen from FIG. 5B, the error causes the filter to assume that the vehicle 100 is West of the true path 502, as indicated by pathlines 512. Accordingly, because the velocity error is generally constant, the position error expands linearly when there is relatively little or no measurement information. This is a limitation of a TAN system without measurement information. However, numerous operations require that the information is recovered once the vehicle 100 has returned to being in flight over varied terrain.

For known implementations, it is typically necessitated to determine a value to use utilize/assume for $\tilde{\sigma}_v$. For example, for a relatively small value of 3 m/s or 4 m/s, the location of the vehicle 100 can walk off the grid, even in a hilly area or well-defined area/terrain. A value of $\tilde{\sigma}_v$ being in the 10-20 m/s range, for example, can be particularly effective while flying over the island and can produce a solution within approximately 100 m. However, when flying over a body of water, the grid does not expand quickly enough and the location of the vehicle 100 walks off the grid. In this example, flying over the body of water can take approximately 18 minutes. Thus, for a $\vec{e}_{\hat{v}}\sqrt{n}/2.5$, an $\tilde{\sigma}_v$ of about 40-50 m/s can be utilized. Even with that assumed error, the location of the vehicle 100 can end up on the edge of the AoPS, thereby causing the PMF to lose the solution. When the $\tilde{\sigma}_v$ is set to a value of 75 m/s, the vehicle 100 stays on the grid even when the vehicle crosses the body of water. Once the vehicle 100 reaches the hills, the PMF begins to reduce the size of the AoLS and locate the vehicle 100.

Figure 5C:
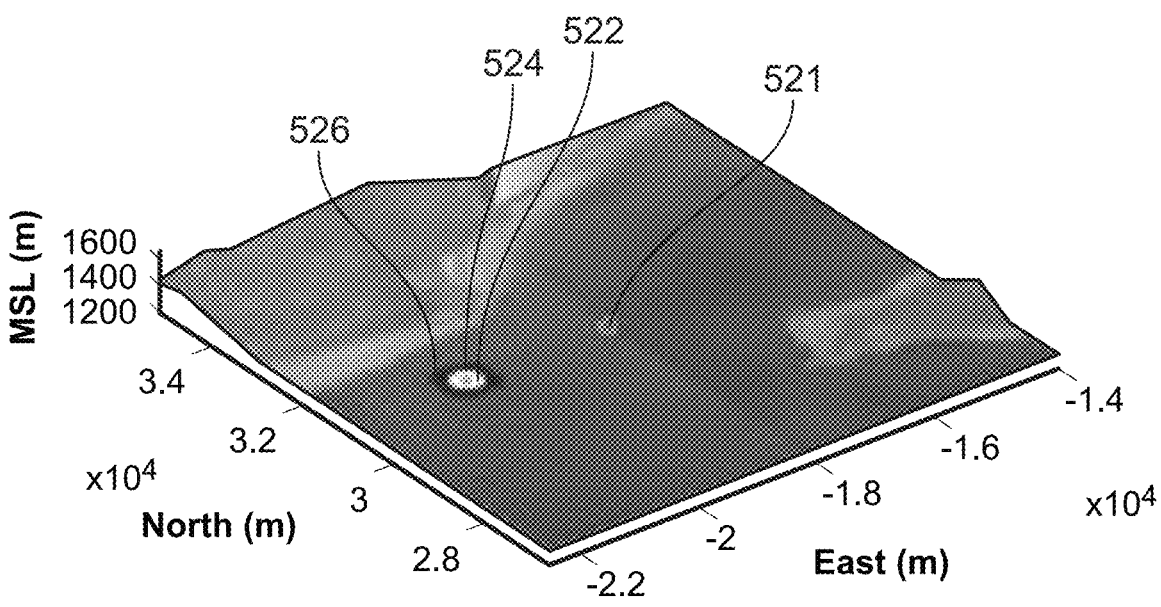
Figure 5C:
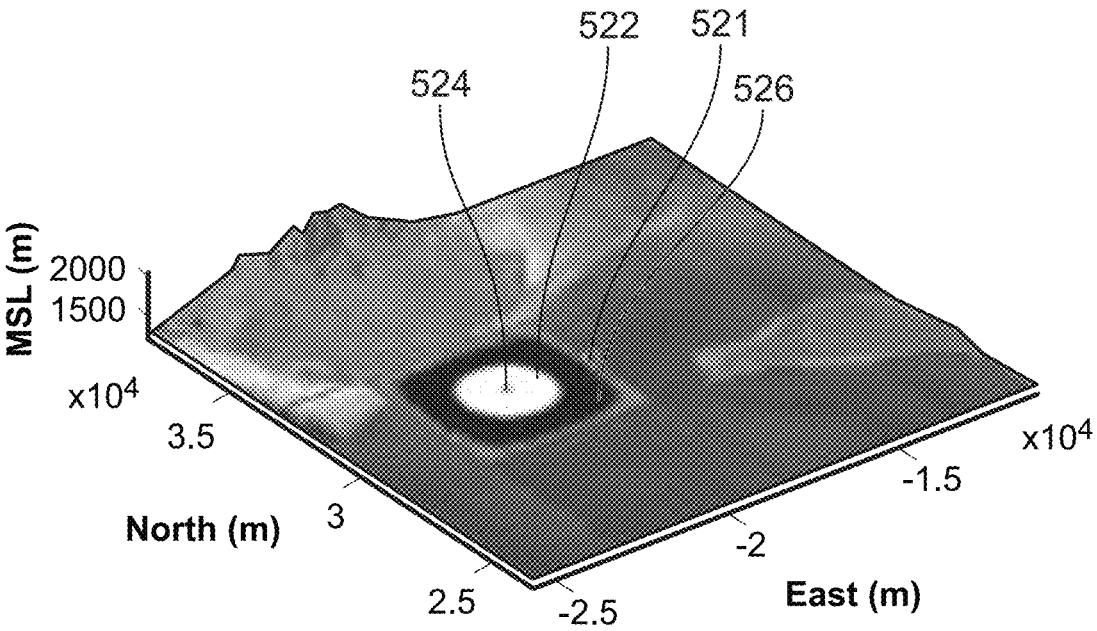

FIG. 5C depicts the grid at two different positions. In this example, FIG. 5C depicts the grid for the $\tilde{\sigma}_v$=10 m/s in the top view and $\tilde{\sigma}_v$=50 m/s in the bottom view. As can be seen, the location of the vehicle 100 is not sufficiently close to the grid in the top view, and barely within the AoPS in the bottom view. However, to ensure that the filter does not fail, the filter is to be provided the error in the velocity estimate of the vehicle 100 at each timestep and the error in the velocity estimate of the vehicle 100 can have a standard deviation of 75 m/s. This relatively large standard of deviation can affect the filter performance as much of the information in $\boxplus p$ is smoothed away due to the relatively large value of $\tilde{\sigma}_v$.

In the illustrated example of FIG. 5C, the grid is shown with a point 521, an AoLS 522 with a grid center 524, and a region of AoPS 526 for both assumed velocity errors. In this example, the aforementioned point 521 corresponds to an actual/true location of the vehicle 100.

Figure 5D:
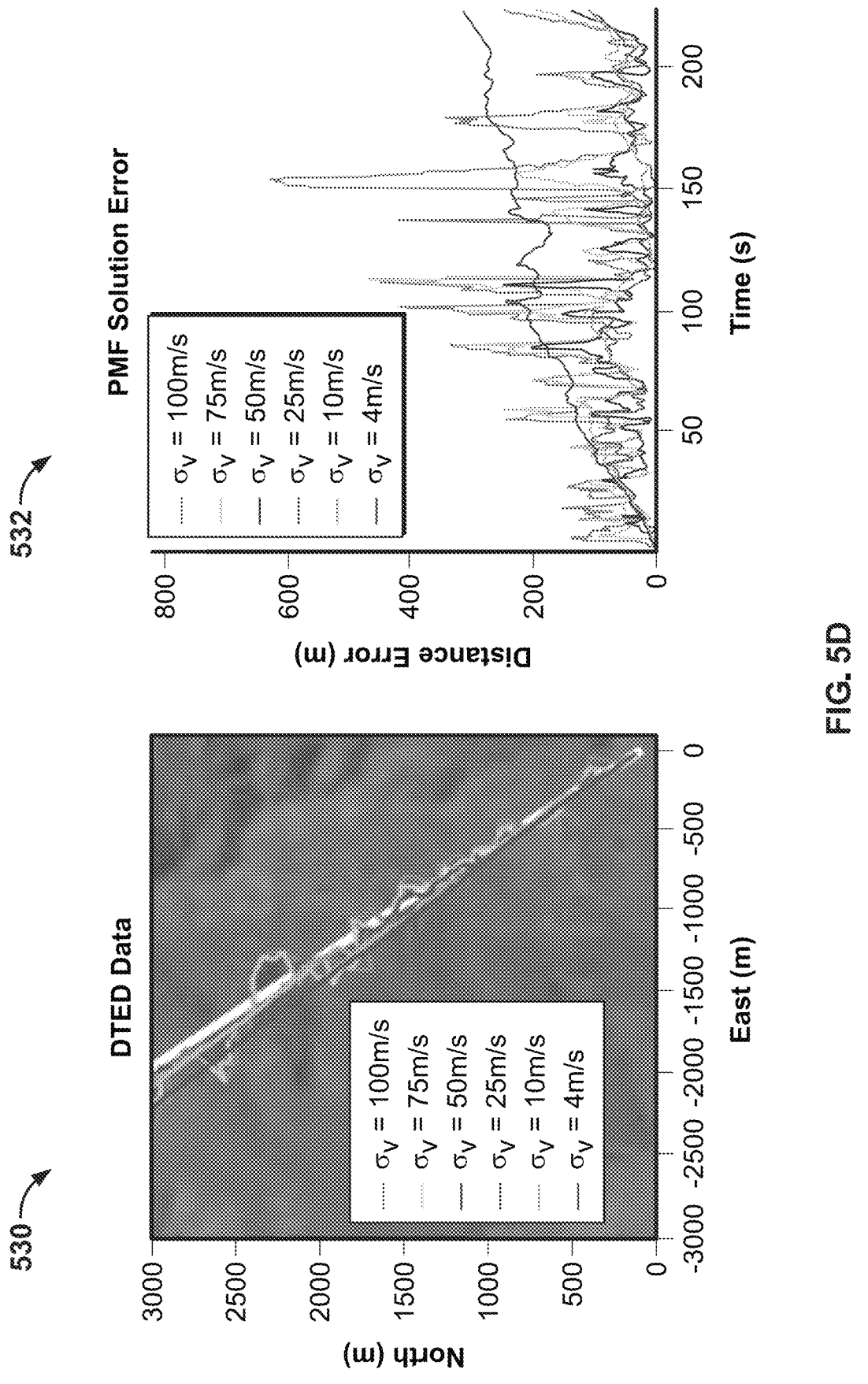

FIG. 5D depicts an example overhead view 530 illustrating a known implementation of PMF with solution paths and distance errors for different values of $\sim\tilde{\sigma}_v$. The overhead view 530 of FIG. 5D depicts the initial path over the island, and a graph 532 shows the corresponding error. From the overhead view 530, it is shown that $\tilde{\sigma}_v$=4 m/s is too low. As a result, the location of the vehicle 100 walks off the grid in a relative quick manner, and the error in position of the vehicle 100 grows almost linearly. Accordingly, $\tilde{\sigma}_v \geq 75$ m/s can result in relatively large errors up to 600 m due to a significant amount of the previous information stored in $\boxplus p$ being deleted, and the solution jumps around the current best point. Values of $\tilde{\sigma}_v$ between 10 m/s and 25 m/s are particularly effective in this scenario with a resultant overall error being approximately 100 m or less, but as mentioned above and shown below, the values are too low to be effective when flying over flat areas.

FIG. 5E depicts a first overhead view 540 with example PMF solution paths and a graph 542 depicting distance error for different values of $\tilde{\sigma}_v$. As can be seen in the graph 542, all of the solutions have errors that increase at a rate of 3 m/s when over the water (time <1020 s). This can be expected as there is little or no measurement information, and the velocity error is unchecked. However, only the solutions with $\tilde{\sigma}_v \geq 75$ m/s are able to recapture the location of the vehicle 100 when information returns due to only these two solutions expanding the grid quickly enough to ensure that the location of the vehicle 100 remains within the grid. The 50 m/s solution had the solution on the edge of the AoPS, but it was too close to the edge, and the location of the vehicle 100 walked off the grid at the last moment. However, the grid and the location of the vehicle 100 overlapped randomly about two minutes later, thereby enabling recovery of the grid with respect to the vehicle 100.

Overall, the filter required artificially increased values of $\tilde{\sigma}_v \geq 75$ m/s to ensure that the location of the vehicle 100 remains within the AoPS. However, these values of $\tilde{\sigma}_v$ are utilized at the expense of filter accuracy, and do not guarantee a solution because the flight path of the vehicle 100 may result in a longer flight over the body of water, thereby resulting in the location of the vehicle 100 moving off of the grid.

Figure 5F:
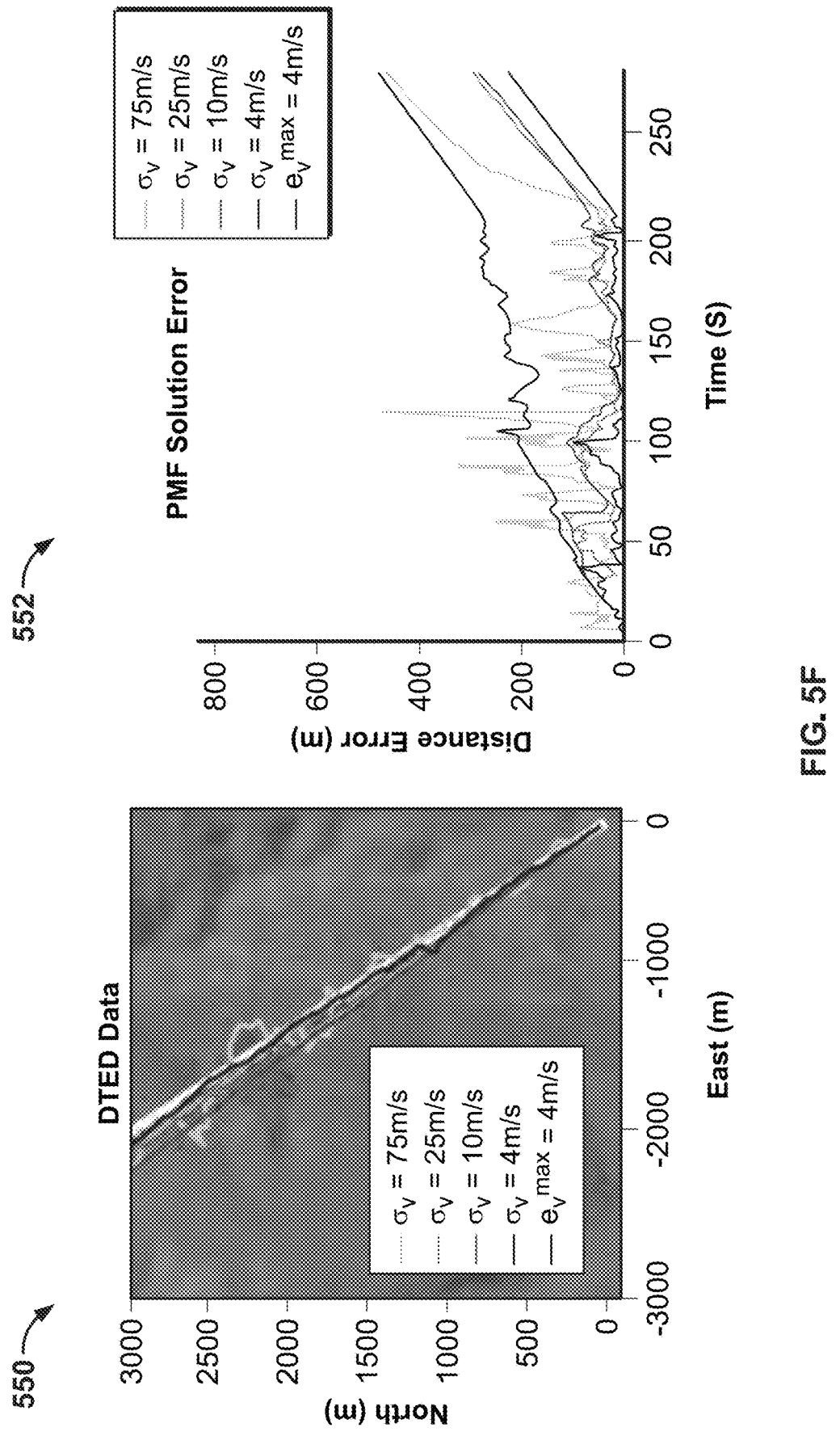

FIG. 5F depicts an overhead view 550 corresponding to PMF solution paths with a graph 552 depicting distance errors for different values of $\tilde{\sigma}_v$ with respect to a linearly expanding AoLS. FIG. 5F illustrates a modified PMF in accordance with teachings of this disclosure in comparison to a traditional PMF. In the illustrated example of FIG. 5F, the linearly expanded and/or linearly adjusted solution has an improved performance in comparison to the traditional PMF in terms of overall error when measurement information is present and/or available.

Figure 5G:
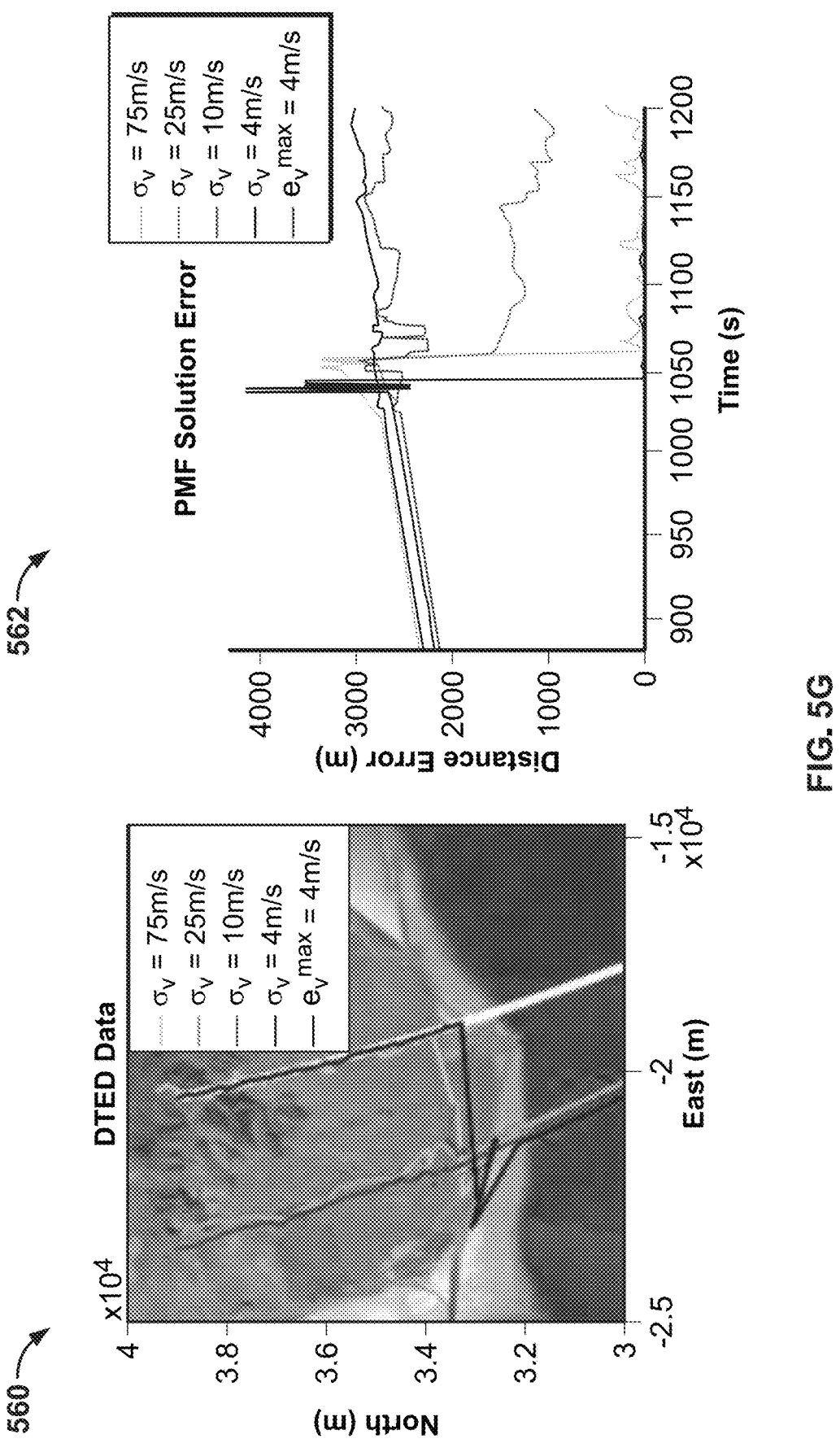

FIG. 5G depicts an overhead view 560 illustrating PMF solution paths along with a graph 562 depicting distance errors for different values of $$\tilde{\sigma}_v \text{ and } \left| \hat{e}_{\hat{v}}^{max} \right|.$$

As can be seen in the graph 562 of FIG. 5G, all of the solutions have errors that grow at a rate of 3 m/s when over the body of water (for t<1020 s). This error rate growth can be expected since there is no measurement information, and the velocity error is generally unchecked. When the vehicle 100 has completed flying over the body of water, the PMF, according to examples disclosed herein, ensures that the location of the vehicle 100 is not only in the AoPS, but also in the AoLS. As a result, the algorithm is enabled to quickly and accurately locate the vehicle 100. Also, since $$|\tilde{e}_{\tilde{v}}^{max}|$$

is maintained relatively small, the accuracy of the solution with available information remains relatively high. In some known methodologies, only a $\tilde{\sigma}_v \geq 75$ m/s is successful for finding the vehicle 100 when the vehicle 100 is flying over the body of water. However, the solution accuracy for relatively high values of $\tilde{\sigma}_v$ can be poor.

Figure 5H:
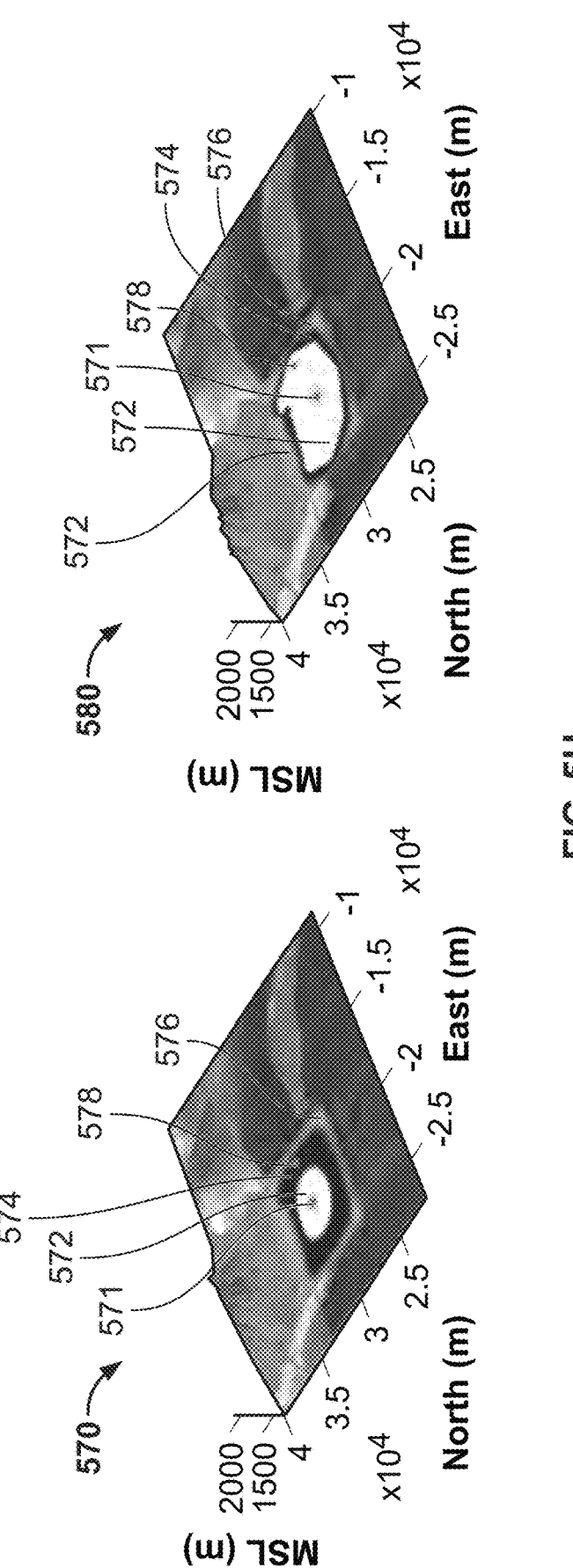

FIG. 5H depicts a grid $\overset{\boxplus}{p}$ on an approach where a grid 570 corresponds to a $\tilde{\sigma}_v$=75 m/s. In particular, the grid 570 for a known PMF implementation with $\tilde{\sigma}_v$=75 m/s is depicted. In the illustrated view of FIG. 5H, a grid center 571, an AoLS 572, an AoPS 574, an outer region 576 and an actual position 578 are shown. Further, a grid 580 corresponding to a PMF in accordance with teachings of this disclosure is shown. With respect to the grid 580, $$|\tilde{e}_{\tilde{v}}^{max}| = 4 \, \text{m/s}.$$

As can be seen in the illustrated example of FIG. 5H, the AoLS 572 is expanded linearly (and circularly) at a rate of 4 m/s while the vehicle 100 is flying over the body of water, thereby ensuring that the location of the vehicle 100 remains within the AoLS 572. In contrast, the grid 570 on the left illustrates problems when the grid is expanded based on the square root of time, as implemented in known systems. For these known systems, to ensure that the vehicle 100 remains within the grid, oy can be assumed to be relatively large.

Figure 6:
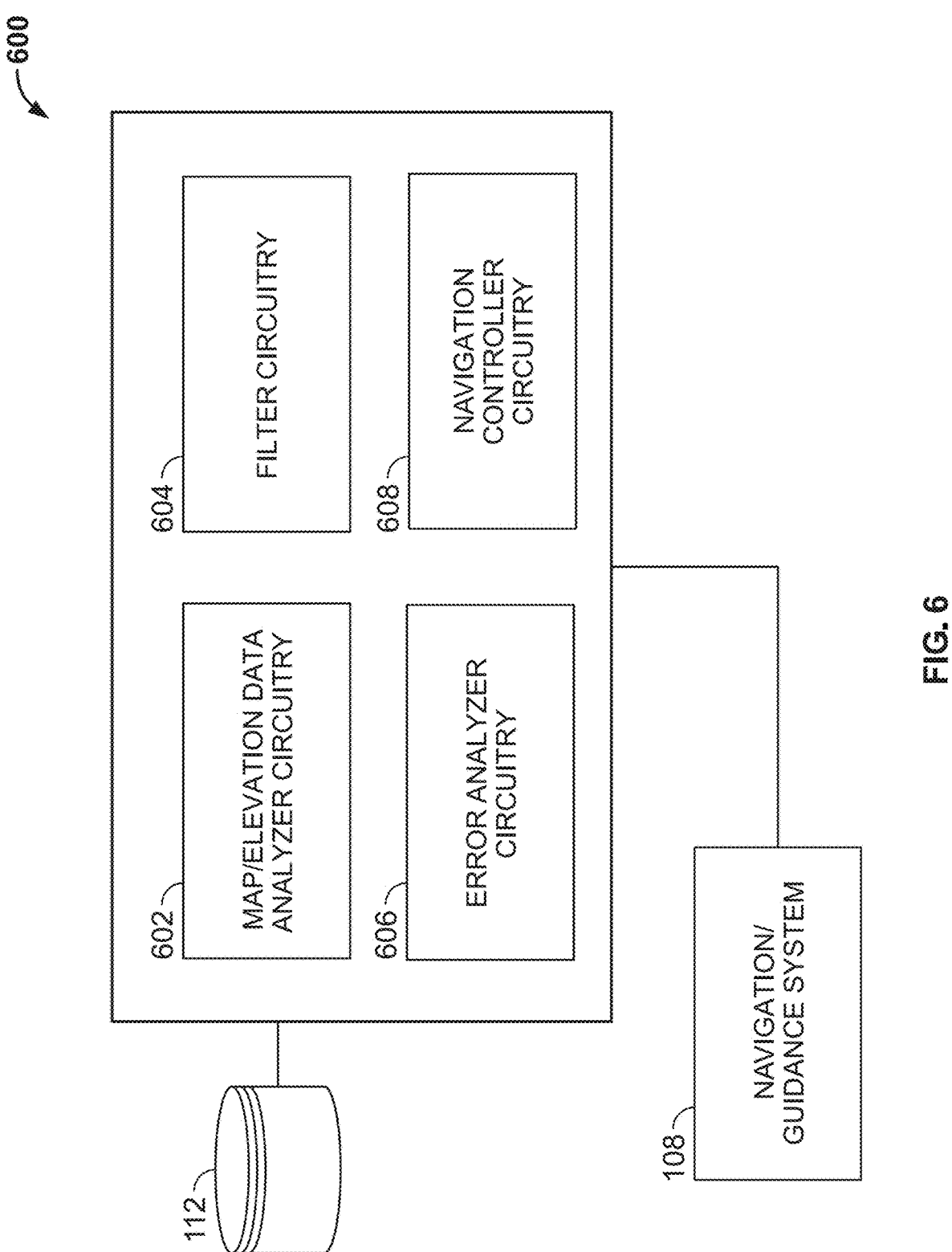
FIG. 6 is a block diagram of an example position probability analysis system that can be implemented in examples disclosed herein.

FIG. 6 is a block diagram of an example implementation of a position probability analysis system 600 to analyze and generate probabilistic determinations of a location/position of a vehicle (e.g., the vehicle 100) for navigation and/or guidance thereof. The position probability analysis system 600 of FIG. 6 may be instantiated (e.g., creating an instance of, bring into being for any length of time, materialize, implement, etc.) by programmable circuitry such as a Central Processor Unit (CPU) executing first instructions. Additionally or alternatively, the position probability analysis system 600 of FIG. 6 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 6 may, thus, be instantiated at the same or different times. Some or all of the circuitry of FIG. 6 may be instantiated, for example, in one or more threads executing concurrently on hardware and/or in series on hardware. Moreover, in some examples, some or all of the circuitry of FIG. 6 may be implemented by microprocessor circuitry executing instructions and/or FPGA circuitry performing operations to implement one or more virtual machines and/or containers.

The example position probability analysis system 600 can be implemented in the example navigation/guidance system 108 shown in FIG. 1, and includes example map/elevation data analyzer circuitry 602, example filter circuitry 604, example error analyzer circuitry 606, and example navigation controller circuitry 608. Further, according to some examples disclosed herein, the position probability analysis system 600 of the illustrated example includes and/or is communicatively coupled to the navigation/guidance system 108 and/or the data storage 112.

The example map/elevation data analyzer circuitry 602 retrieves, accesses and/or selects terrain data of an area from the onboard data storage 112 of a vehicle (e.g., the vehicle 100), which is a UAV in this example. In turn, the map/elevation data analyzer circuitry 602 generates and/or adjusts (e.g., linearly adjusts) a grid (e.g., a search grid, a probabilistic grid, a 2D location probability grid, etc.) based on a comparison of data (e.g., spatial data, terrain data, etc.) obtained/measured by an onboard sensor (e.g., the sensor(s) 110) of the UAV. According to some examples disclosed herein, the stored terrain data is compared to the data obtained/measured by the onboard sensor of the UAV to determine at least one measurement error with respect to the grid. The grid can include a 2D array and/or matrix of location probabilities of corresponding points of the grid with respect to a location of the UAV. In some examples, the example map/elevation data analyzer circuitry 602 identifies the point of the grid with the highest probability for designation as being a (new) position estimate. Additionally or alternatively, a grid point corresponding to an average value of the grid points is selected as the point of the grid with the most likely solution. In some examples, a new or updated probability is multiplied by a previous likelihood.

According to some examples, the map/elevation data analyzer circuitry 602 updates a bias estimate for each point of the grid. In some examples, a filter (e.g., a Kalman filter) is utilized to correct a further measurement step. Additionally or alternatively, the map/elevation data analyzer circuitry 602 culls points of the grid with relatively low (e.g., near zero probabilities), thereby preventing the grid from becoming relatively large and, thus, advantageously reducing associated computational requirements. In some examples, the map/elevation data analyzer circuitry 602 is instantiated by programmable circuitry executing map/elevation data analyzer instructions and/or configured to perform operations such as those represented by the flowchart of FIG. 7.

The filter circuitry 604 of the illustrated example utilizes a PMF and is implemented to move the grid, as well as adjust a size of the grid. In particular, the example filter circuitry 604 can be utilized to expand or contract the grid. Additionally or alternatively, the filter circuitry 604 is to smooth the grid. In the illustrated example of FIG. 6, the filter circuitry 604 can utilize the PMF without having information regarding a flight path of the UAV.

To move the grid, the example filter circuitry 604 utilizes an estimated velocity of the UAV. In some examples, the solution point (e.g., the assumed position of the UAV) remains generally unchanged (in grid coordinates) from one timestep to a subsequent timestep. According to examples disclosed herein, errors in the estimated velocity cause the true solution to change. Accordingly, velocity errors can cause a true location of the UAV to move within the grid.

To mitigate the effects of velocity errors, the filter circuitry 604 of the illustrated example adjusts a size of the grid (e.g., expands the grid, shrinks the grid, etc.). According to some examples disclosed herein, the filter circuitry 604 expands the grid to encompass the true location of the UAV. Accordingly, the expansion and culling of the grid can enable the grid to move with the UAV to mitigate the effect velocity errors causing the location of the UAV to move through the grid while further reducing computational burdens/requirements. In some examples, the filter circuitry 604 is instantiated by programmable circuitry executing filter instructions and/or configured to perform operations such as those represented by the flowchart of FIG. 7. In some examples, the filter circuitry 604 adjusts and/or smooths the grid in substantially real time.

In some examples, the error analyzer circuitry 606 determines a degree of error associated with the UAV. In some such examples, the error analyzer circuitry 606 can determine a velocity error and/or a velocity error range/tolerance of the UAV for use with movement and/or adjusting a size of the grid by the filter circuitry 604. In some examples, the error analyzer circuitry 606 determines the degree of error based on capabilities and/or limitations of the UAV. Additionally or alternatively, the error analyzer circuitry 606 calculates a degree of uncertainty of the velocity estimate with respect to the UAV, for example. In some examples, the error analyzer circuitry 606 is instantiated by programmable circuitry executing error analyzer instructions and/or configured to perform operations such as those represented by the flowchart of FIG. 7.

According to the illustrated example of FIG. 6, the navigation controller circuitry 608 is implemented to direct and/or control navigation/guidance of the UAV. The example navigation controller circuitry 608 can utilize the point of the grid having the highest probability to guide movement and/or navigation of the UAV. In other words, the example navigation controller circuitry 608 can utilize the point with the highest probability as an assumed location of the UAV. In some examples, the navigation controller circuitry 608 can adjust for an uncertainty of the location of the UAV (e.g., by reducing a speed of the UAV until the velocity error decreases to a threshold error level, by initiating a turning and/or sweeping movement to guide the UAV closer to an area with GNSS signals, etc.). In some examples, the navigation controller circuitry 608 is instantiated by programmable circuitry executing navigation controller instructions and/or configured to perform operations such as those represented by the flowchart of FIG. 7.

While an example manner of implementing the position probability analysis system 600 of FIG. 1 is illustrated in FIG. 6, one or more of the elements, processes, and/or devices illustrated in FIG. 6 may be combined, divided, re-arranged, omitted, eliminated, and/or implemented in any other way. Further, the example map/elevation data analyzer circuitry 602, the example filter circuitry 604, the example error analyzer circuitry 606, the example navigation controller circuitry 608, and/or, more generally, the example position probability analysis system 600 of FIG. 6, may be implemented by hardware alone or by hardware in combination with software and/or firmware. Thus, for example, any of the example map/elevation data analyzer circuitry 602, the example filter circuitry 604, the example error analyzer circuitry 606, the example navigation controller circuitry 608, and/or, more generally, the example position probability analysis system 600, could be implemented by programmable circuitry in combination with machine readable instructions (e.g., firmware or software), processor circuitry, analog circuit(s), digital circuit(s), logic circuit(s), programmable processor(s), programmable microcontroller (s), graphics processing unit(s) (GPU(s)), digital signal processor(s) (DSP(s)), ASIC(s), programmable logic device (s) (PLD(s)), and/or field programmable logic device(s) (FPLD(s)) such as FPGAs. Further still, the example position probability analysis system 600 of FIG. 6 may include one or more elements, processes, and/or devices in addition to, or instead of, those illustrated in FIG. 6, and/or may include more than one of any or all of the illustrated elements, processes and devices.

Figure 7:
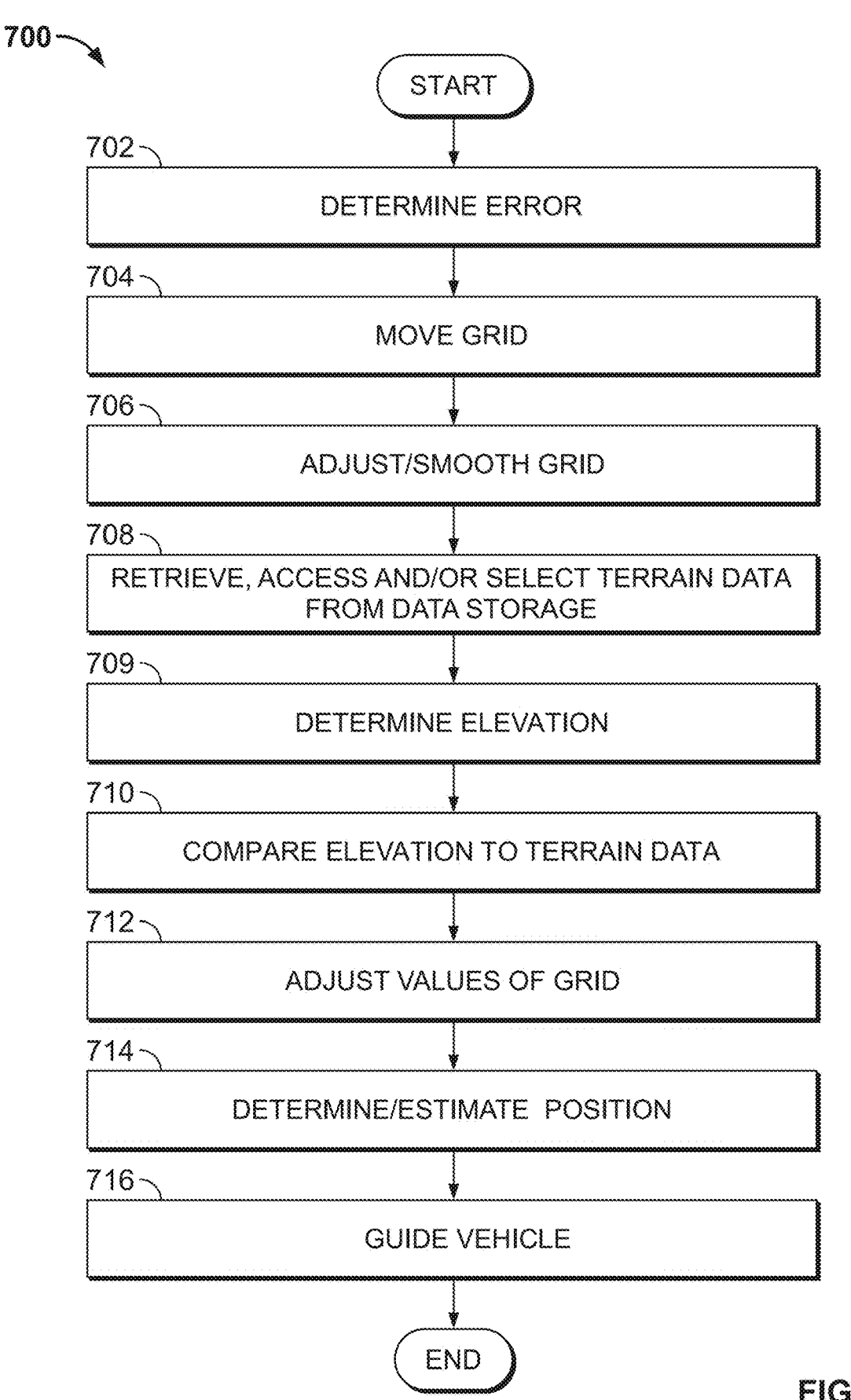
FIG. 7 is a flowchart representative of example machine readable instructions and/or example operations that may be executed, instantiated, and/or performed by example programmable circuitry to implement the position probability analysis system of FIG. 6.

A flowchart representative of example machine readable instructions, which may be executed by programmable circuitry to implement and/or instantiate the position probability analysis system 600 of FIG. 6 and/or representative of example operations which may be performed by programmable circuitry to implement and/or instantiate the position probability analysis system 600 of FIG. 6, are shown in FIG. 7. The machine readable instructions may be one or more executable programs or portion(s) of one or more executable programs for execution by programmable circuitry such as the programmable circuitry 812 shown in the example processor platform 800 discussed below in connection with FIG. 8 and/or may be one or more function(s) or portion(s) of functions to be performed by the example programmable circuitry (e.g., an FPGA) discussed below in connection with FIGS. 9 and/or 10. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 7, many other methods of implementing the example position probability analysis system 600 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 7 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 7 is a flowchart representative of example machine readable instructions and/or example operations 700 that may be executed, instantiated, and/or performed by programmable circuitry to guide movement and/or navigation of a vehicle (e.g., the vehicle 100). In this example, the vehicle is a self-guided UAV (and/or UAS) that is moving from an area with well-defined terrain to a relatively flat area or, alternatively, a body of water. The example machine-readable instructions and/or the example operations 700 of FIG. 7 begin at block 702, according to some examples disclosed herein, the error analyzer circuitry 606 determines a degree of error associated with a UAV and/or movement thereof. In this example, the degree of error corresponds to a velocity error of the UAV. In some examples, the error analyzer circuitry 606 utilizes capabilities/specifications of the UAV, external conditions, lack of information/sensor data, etc. to determine the degree of error associated with the UAV.

At block 704, the example map/elevation data analyzer circuitry 602 and/or the example filter circuitry 604 moves a grid. In this example, the map/elevation data analyzer circuitry 602 and/or the example filter circuitry 604 moves the grid based on points of the grid having higher corresponding probabilities. Accordingly, the map/elevation data analyzer circuitry 602 and/or the example filter circuitry 604 can utilize a region and/or point of the grid having the highest relative probabilities.

At block 706, the filter circuitry 604 of the illustrated example adjusts and/or smooths out the grid. In the illustrated example of FIG. 7, the filter circuitry 604 expands the grid based on the aforementioned degree of error associated with the UAV. According to examples disclosed herein, the filter circuitry 604 can expand or contract the grid linearly with respect to time. In some examples, regions and/or portions of the grid corresponding to AoLS and/or AoPS are expanded linearly with respect to time. In other words, regions (e.g., spatial regions) of the grid corresponding to the AoLS and/or the AoPS can be expanded (or contracted) linearly with respect to time along a 2D plane defined by the grid. However, any other appropriate parameter can be utilized instead of time.

block 708, at which the example map/elevation data analyzer circuitry 602 retrieves, accesses and/or selects terrain data of an area from the onboard data storage 112. Further, the grid corresponding to the UAV is utilized for determination of a position of the UAV (e.g., the UAV cannot receive GNSS signals, GNSS signals are jammed, etc.). According to some examples disclosed herein, the grid is utilized as a probabilistic 2D array/matrix that corresponds to potential positions/locations of the UAV.

At block 709, the map/elevation data analyzer circuitry 602 of the illustrated example determines an elevation (e.g., an elevation map, an elevation grid, etc.) measured by an onboard sensor of the UAV. The onboard sensor may be and/or include a camera, a range-finding sensor, a laser sensor, etc., or any other appropriate type of sensor to measure the elevation of the terrain.

At block 710, the map/elevation data analyzer circuitry 602 of the illustrated example compares the elevation to terrain data. In this example, the map/elevation data analyzer circuitry 602 compares measured points obtained by the aforementioned onboard sensor to stored elevation data.

At block 712, the map/elevation data analyzer circuitry 602 and/or the filter circuitry 604 adjusts values of points of the grid. For example, the map/elevation data analyzer circuitry 602 and/or the filter circuitry 604 adjusts and/or determines probabilities of individual points of the grid probabilistically being the location of the UAV based on the comparison of the terrain to the terrain data (block 706).

At block 714, the navigation controller circuitry 608 of the illustrated example estimates a position of the UAV. According to examples disclosed herein, the navigation controller circuitry 608 estimates the position of the UAV by utilizing at least one point of the grid having a higher probability (e.g., the point(s) on the grid having the maximum probability/probabilities, a region of the grid corresponding to higher probabilities, etc.).

At block 716, in some examples, the navigation controller circuitry 608 utilizes the estimated position to guide the vehicle 100 and the process ends. In some such examples, the navigation controller circuitry 608 guides movement of the UAV utilizing the point on the grid with the highest probability. Additionally or alternatively, the example navigation controller circuitry 608 is caused to utilize the grid and/or estimate the position of the UAV in response to a loss of GNSS signals and/or sufficient terrain definition.

Figure 8:
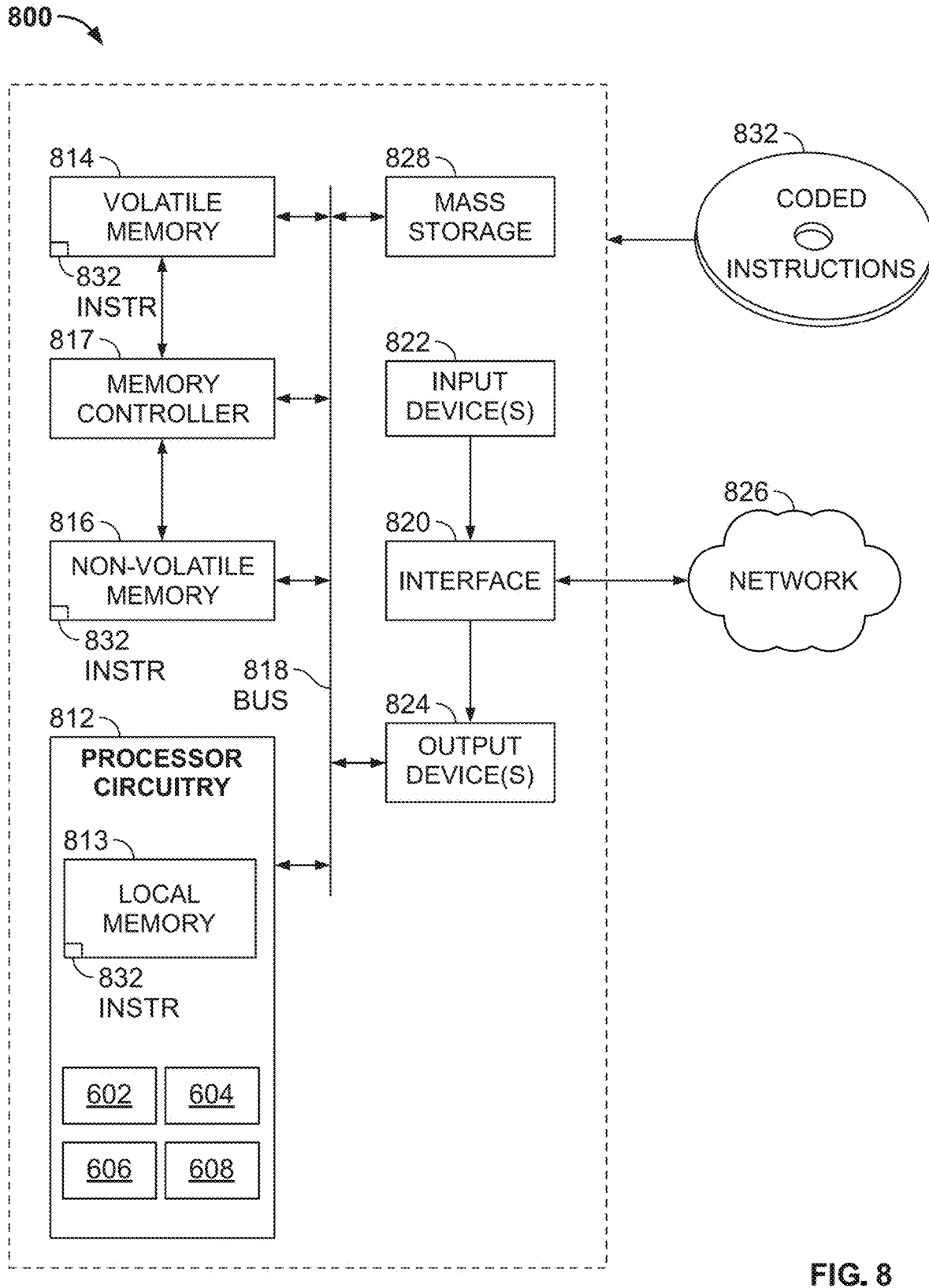
FIG. 8 is a block diagram of an example processing platform including programmable circuitry structured to execute, instantiate, and/or perform the example machine readable instructions and/or perform the example operations of FIG. 7 to implement the position probability analysis system of FIG. 6.

FIG. 8 is a block diagram of an example programmable circuitry platform 800 structured to execute and/or instantiate the example machine-readable instructions and/or the example operations of FIG. 7 to implement the position probability analysis system 600 of FIG. 6. The programmable circuitry platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 800 of the illustrated example includes programmable circuitry 812. The programmable circuitry 812 of the illustrated example is hardware. For example, the programmable circuitry 812 can be implemented by one or more integrated circuits, logic circuits, FPGAs, microprocessors, CPUs, GPUs, DSPs, and/or microcontrollers from any desired family or manufacturer. The programmable circuitry 812 may be implemented by one or more semiconductor based (e.g., silicon based) devices. In this example, the programmable circuitry 812 implements the example map/elevation data analyzer circuitry 602, the example filter circuitry 604, the example error analyzer circuitry 606, and the example navigation controller circuitry 608.

The programmable circuitry 812 of the illustrated example includes a local memory 813 (e.g., a cache, registers, etc.). The programmable circuitry 812 of the illustrated example is in communication with main memory 814, 816, which includes a volatile memory 814 and a non-volatile memory 816, by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817. In some examples, the memory controller 817 may be implemented by one or more integrated circuits, logic circuits, microcontrollers from any desired family or manufacturer, or any other type of circuitry to manage the flow of data going to and from the main memory 814, 816.

The programmable circuitry platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user (e.g., a human user, a machine user, etc.) to enter data and/or commands into the programmable circuitry 812. The input device(s) 822 can be implemented by, for example, an audio sensor, a microphone, a camera (still or video), a keyboard, a button, a mouse, a touchscreen, a trackpad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 800 of the illustrated example also includes one or more mass storage discs or devices 828 to store firmware, software, and/or data. Examples of such mass storage discs or devices 828 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 832, which may be implemented by the machine readable instructions of FIG. 7, may be stored in the mass storage device 828, in the volatile memory 814, in the non-volatile memory 816, and/or on at least one non-transitory computer readable storage medium such as a CD or DVD which may be removable.

Figure 9:
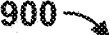
FIG. 9 is a block diagram of an example implementation of the programmable circuitry of FIG. 8.

FIG. 9 is a block diagram of an example implementation of the programmable circuitry 812 of FIG. 8. In this example, the programmable circuitry 812 of FIG. 8 is implemented by a microprocessor 900. For example, the microprocessor 900 may be a general-purpose microprocessor (e.g., general-purpose microprocessor circuitry). The microprocessor 900 executes some or all of the machine-readable instructions of the flowchart of FIG. 7 to effectively instantiate the circuitry of FIG. 2 as logic circuits to perform operations corresponding to those machine readable instructions. In some such examples, the circuitry of FIG. 6 is instantiated by the hardware circuits of the microprocessor 900 in combination with the machine-readable instructions. For example, the microprocessor 900 may be implemented by multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowchart of FIG. 7.

The cores 902 may communicate by a first example bus 904. In some examples, the first bus 904 may be implemented by a communication bus to effectuate communication associated with one(s) of the cores 902. For example, the first bus 904 may be implemented by at least one of an Inter-Integrated Circuit (I2C) bus, a Serial Peripheral Interface (SPI) bus, a PCI bus, or a PCIe bus. Additionally or alternatively, the first bus 904 may be implemented by any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2 cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the local memory 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating-point operations. In yet other examples, the AL circuitry 916 may include first AL circuitry that performs integer-based operations and second AL circuitry that performs floating-point operations. In some examples, the AL circuitry 916 may be referred to as an Arithmetic Logic Unit (ALU).

The registers 918 are semiconductor-based structures to store data and/or instructions such as results of one or more of the operations performed by the AL circuitry 916 of the corresponding core 902. For example, the registers 918 may include vector register(s), SIMD register(s), general-purpose register(s), flag register(s), segment register(s), machine-specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure, such as by being distributed throughout the core 902 to shorten access time. The second bus 922 may be implemented by at least one of an I2C bus, a SPI bus, a PCI bus, or a PCIe bus.

Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages.

The microprocessor 900 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be onboard the microprocessor 900, in the same chip package as the microprocessor 900 and/or in one or more separate packages from the microprocessor 900.

Figure 10:
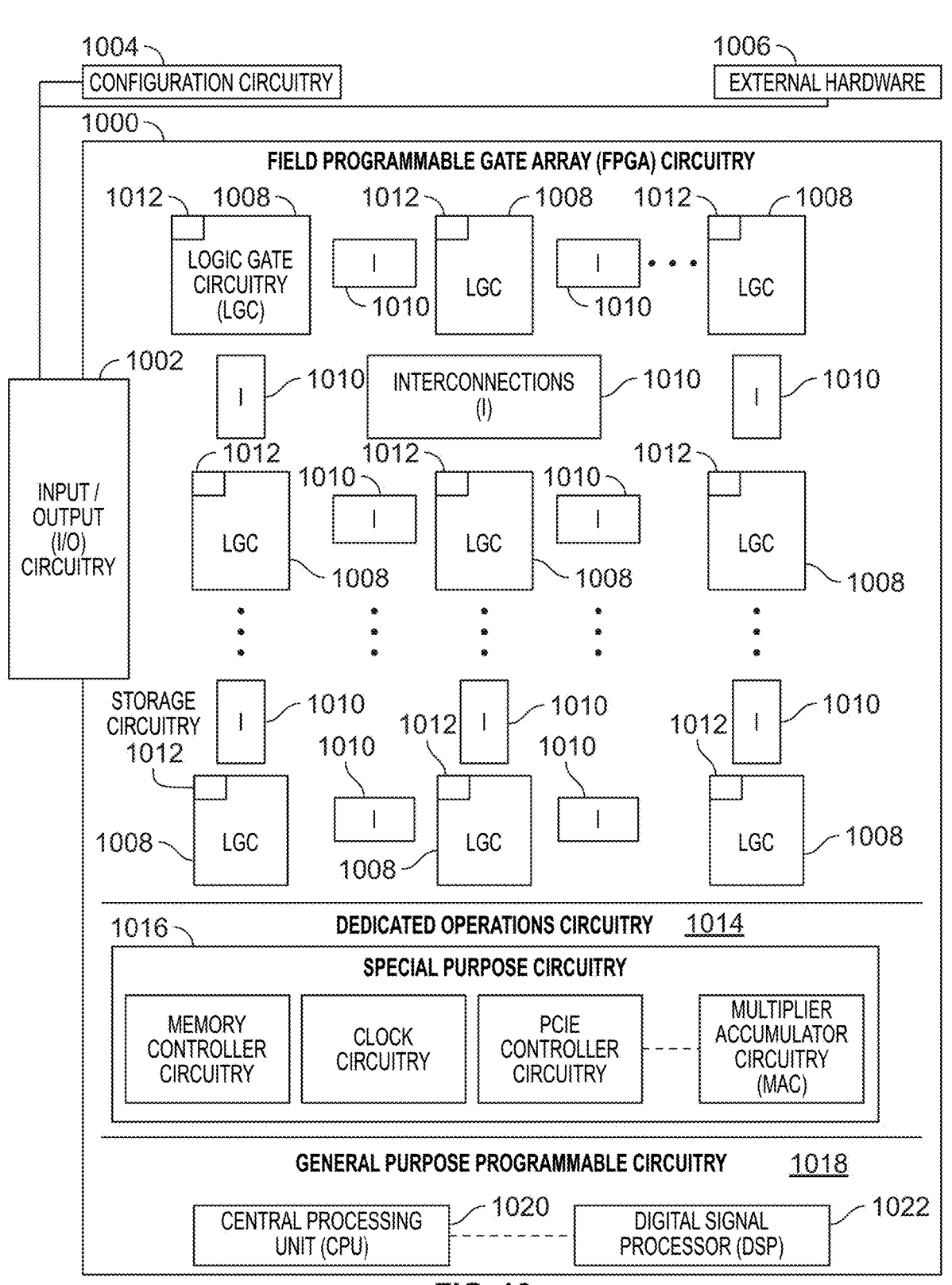
FIG. 10 is a block diagram of another example implementation of the programmable circuitry of FIG. 8.

FIG. 10 is a block diagram of another example implementation of the programmable circuitry 812 of FIG. 8. In this example, the programmable circuitry 812 is implemented by FPGA circuitry 1000. For example, the FPGA circuitry 1000 may be implemented by an FPGA. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 900 of FIG. 9 described above (which is a general purpose device that may be programmed to execute some or all of the machine readable instructions represented by the flowchart of FIG. 7 but whose interconnections and logic circuitry are fixed once fabricated), the FPGA circuitry 1000 of the example of FIG. 10 includes interconnections and logic circuitry that may be configured, structured, programmed, and/or interconnected in different ways after fabrication to instantiate, for example, some or all of the operations/ functions corresponding to the machine readable instructions represented by the flowchart of FIG. 7. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the instructions (e.g., the software and/or firmware) represented by the flowchart of FIG. 7. As such, the FPGA circuitry 1000 may be configured and/or structured to effectively instantiate some or all of the operations/functions corresponding to the machine readable instructions of the flowchart of FIG. 7 as dedicated logic circuits to perform the operations/functions corresponding to those software instructions in a dedicated manner analogous to an ASIC. Therefore, the FPGA circuitry 1000 may perform the operations/functions corresponding to the some or all of the machine readable instructions of FIG. 7 faster than the general-purpose microprocessor can execute the same.

In the example of FIG. 10, the FPGA circuitry 1000 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1000 of FIG. 10 may access and/or load the binary file to cause the FPGA circuitry 1000 of FIG. 10 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1000 of FIG. 10 to cause configuration and/or structuring of the FPGA circuitry 1000 of FIG. 10, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1000 of FIG. 10 may access and/or load the binary file to cause the FPGA circuitry 1000 of FIG. 10 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1000 of FIG. 10 to cause configuration and/or structuring of the FPGA circuitry 1000 of FIG. 10, or portion(s) thereof.

The FPGA circuitry 1000 of FIG. 10, includes example input/output (I/O) circuitry 1002 to obtain and/or output data to/from example configuration circuitry 1004 and/or external hardware 1006. For example, the configuration circuitry 1004 may be implemented by interface circuitry that may obtain a binary file, which may be implemented by a bit stream, data, and/or machine-readable instructions, to configure the FPGA circuitry 1000, or portion(s) thereof. In some such examples, the configuration circuitry 1004 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1006 may be implemented by external hardware circuitry. For example, the external hardware 1006 may be implemented by the microprocessor 900 of FIG. 9.

The FPGA circuitry 1000 also includes an array of example logic gate circuitry 1008, a plurality of example configurable interconnections 1010, and example storage circuitry 1012. The logic gate circuitry 1008 and the configurable interconnections 1010 are configurable to instantiate one or more operations/functions that may correspond to at least some of the machine readable instructions of FIG. 7 and/or other desired operations. The logic gate circuitry 1008 shown in FIG. 10 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations/functions. The logic gate circuitry 1008 may include other electrical structures such as look-up tables (LUTs), registers (e.g., flip-flops or latches), multiplexers, etc.

The configurable interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example dedicated operations circuitry 1014. In this example, the dedicated operations circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the programmable circuitry 812 of FIG. 8, many other approaches are contemplated. For example, FPGA circuitry may include an onboard CPU, such as one or more of the example CPU 1020 of FIG. 9. Therefore, the programmable circuitry 812 of FIG. 8 may additionally be implemented by combining at least the example microprocessor 900 of FIG. 9 and the example FPGA circuitry 1000 of FIG. 10. In some such hybrid examples, one or more cores 902 of FIG. 9 may execute a first portion of the machine readable instructions represented by the flowchart of FIG. 7 to perform first operation(s)/function(s), the FPGA circuitry 1000 of FIG. 10 may be configured and/or structured to perform second operation(s)/function(s) corresponding to a second portion of the machine readable instructions represented by the flowchart of FIG. 7, and/or an ASIC may be configured and/or structured to perform third operation(s)/function(s) corresponding to a third portion of the machine readable instructions represented by the flowchart of FIG. 7.

It should be understood that some or all of the circuitry of FIG. 6 may, thus, be instantiated at the same or different times. For example, same and/or different portion(s) of the microprocessor 900 of FIG. 9 may be programmed to execute portion(s) of machine-readable instructions at the same and/or different times. In some examples, same and/or different portion(s) of the FPGA circuitry 1000 of FIG. 10 may be configured and/or structured to perform operations/functions corresponding to portion(s) of machine-readable instructions at the same and/or different times.

In some examples, some or all of the circuitry of FIG. 6 may be instantiated, for example, in one or more threads executing concurrently and/or in series. For example, the microprocessor 900 of FIG. 9 may execute machine readable instructions in one or more threads executing concurrently and/or in series. In some examples, the FPGA circuitry 1000 of FIG. 10 may be configured and/or structured to carry out operations/functions concurrently and/or in series. Moreover, in some examples, some or all of the circuitry of FIG. 6 may be implemented within one or more virtual machines and/or containers executing on the microprocessor 900 of FIG. 9.

In some examples, the programmable circuitry 812 of FIG. 8 may be in one or more packages. For example, the microprocessor 900 of FIG. 9 and/or the FPGA circuitry 1000 of FIG. 10 may be in one or more packages. In some examples, an XPU may be implemented by the programmable circuitry 812 of FIG. 8, which may be in one or more packages. For example, the XPU may include a CPU (e.g., the microprocessor 900 of FIG. 9, the CPU 1020 of FIG. 10, etc.) in one package, a DSP (e.g., the DSP 1022 of FIG. 10) in another package, a GPU in yet another package, and an FPGA (e.g., the FPGA circuitry 1000 of FIG. 10) in still yet another package.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein, integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

Example methods, apparatus, systems, and articles of manufacture to enable accurate and computationally efficient determination of a vehicle location are disclosed herein. Further examples and combinations thereof include the following:

Example 1 includes an apparatus to adjust a probabilistic grid of a point mass filter for navigation of a vehicle, the apparatus comprising interface circuitry communicatively coupled to a sensor of the vehicle, machine readable instructions, and programmable circuitry to at least one of instantiate or execute the machine readable instructions to move the probabilistic grid based on movement of the vehicle, and perform a linear adjustment of at least a portion of the probabilistic grid with respect to time based on a bounded error corresponding to the movement of the vehicle.

Example 2 includes the apparatus as defined in example 1, wherein the programmable circuitry is to determine an estimate of a position of the vehicle based on the probabilistic grid.

Example 3 includes the apparatus as defined in example 1, wherein the programmable circuitry is to linearly adjust a size of a two-dimensional region of the probabilistic grid.

Example 4 includes the apparatus as defined in example 3, wherein the programmable circuitry is to linearly adjust a two-dimensional area of the region based on the bounded error with respect to a first order of time.

Example 5 includes the apparatus as defined in example 1, wherein the programmable circuitry is to identify a point of the probabilistic grid having a highest probability value to estimate a position of the vehicle.

Example 6 includes the apparatus as defined in example 5, wherein the programmable circuitry is to center the probabilistic grid based on the identified point.

Example 7 includes the apparatus as defined in example 1, wherein the programmable circuitry is to smooth the probabilistic grid.

Example 8 includes the apparatus as defined in example 1, wherein the programmable circuitry is to determine a degree of the bounded error with respect to a velocity error of the vehicle, and wherein the linear adjustment of the at least a portion of the probabilistic grid is based on the velocity error.

Example 9 includes a non-transitory machine readable storage medium comprising instructions to cause programmable circuitry to at least move a probabilistic grid of a point mass filter corresponding to navigation of a vehicle based on a movement of the vehicle, and perform a linear adjustment of at least a portion of the probabilistic grid with respect to time based on a bounded error corresponding to the movement of the vehicle.

Example 10 includes the non-transitory machine readable storage medium as defined in example 9, wherein the instructions cause the programmable circuitry to determine an estimate of a position of the vehicle based on the probabilistic grid.

Example 11 includes the non-transitory machine readable storage medium as defined in example 9, wherein the instructions cause the programmable circuitry to linearly adjust a size of a two-dimensional region of the probabilistic grid.

Example 12 includes the non-transitory machine readable storage medium as defined in example 11, wherein the instructions cause the programmable circuitry to linearly adjust a two-dimensional area of the region based on the bounded error with respect to a first order of time.

Example 13 includes the non-transitory machine readable storage medium as defined in example 9, wherein the instructions cause the programmable circuitry to identify a point of the probabilistic grid having a highest probability value to estimate a position of the vehicle.

Example 14 includes the non-transitory machine readable storage medium as defined in example 13, wherein the instructions cause the programmable circuitry to center the probabilistic grid based on the identified point.

Example 15 includes the non-transitory machine readable storage medium as defined in example 9, wherein the instructions cause the programmable circuitry to smooth the probabilistic grid.

Example 16 includes the non-transitory machine readable storage medium as defined in example 9, wherein the instructions cause the programmable circuitry to determine the bounded error with respect to a velocity error of the vehicle, and wherein the linear adjustment of the at least a portion of the probabilistic grid is based on the velocity error.

Example 17 includes a method comprising moving, by executing instructions with programmable circuitry, a probabilistic grid of a point mass filter for navigation of a vehicle based on a movement of the vehicle, and performing, by executing instructions with the programmable circuitry, a linear adjustment of at least a portion of the probabilistic grid with respect to time based on a bounded error corresponding to movement of the vehicle.

Example 18 includes the method as defined in example 17, the linear adjustment of the probabilistic grid is performed by adjusting a size of a two-dimensional region of the probabilistic grid.

Example 19 includes the method as defined in example 17, further including smoothing, by executing instructions with the programmable circuitry, the probabilistic grid.

Example 20 includes the method as defined in example 17, further including determining by executing instructions with the programmable circuitry, the bounded error with respect to a velocity error of the vehicle, and wherein the linear adjustment of the at least a portion of the probabilistic grid is based on the velocity error.

From the foregoing, it will be appreciated that example systems, apparatus, articles of manufacture, and methods have been disclosed that enable efficient determination of a location by linearly adjusting a grid of a PMF. Examples disclosed herein can accurately determine a position of a vehicle travelling over water or other environment that is not amenable to utilizing terrain. Examples can also mitigate the effects of non-zero bias errors. Disclosed systems, apparatus, articles of manufacture, and methods improve the efficiency of using a computing device by accounting for non-zero bias errors and providing a computationally efficient methodology for maintaining a vehicle in a grid and, thus, reducing and/or eliminating a need to computationally correct and/or adjust for the vehicle exiting the grid. As a result, examples disclosed herein are computationally efficient. Disclosed systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus to adjust a probabilistic grid of a point mass filter for navigation of a vehicle, the apparatus comprising:

interface circuitry communicatively coupled to a sensor of the vehicle;

machine readable instructions; and programmable circuitry to at least one of instantiate or execute the machine readable instructions to:

move the probabilistic grid based on movement of the vehicle; and linearly adjust a size of a two-dimensional region of the probabilistic grid with respect to time based on a bounded error corresponding to the movement of the vehicle.

2. The apparatus as defined in claim 1, wherein the programmable circuitry is to determine an estimate of a position of the vehicle based on the probabilistic grid.

3. The apparatus as defined in claim 1, wherein the programmable circuitry is to linearly adjust a two-dimensional area of the region based on the bounded error with respect to a first order of time.

4. The apparatus as defined in claim 1, wherein the programmable circuitry is to identify a point of the probabilistic grid having a highest probability value to estimate a position of the vehicle.

5. The apparatus as defined in claim 4, wherein the programmable circuitry is to center the probabilistic grid based on the identified point.

6. The apparatus as defined in claim 1, wherein the programmable circuitry is to smooth the probabilistic grid.

7. The apparatus as defined in claim 1, wherein the programmable circuitry is to determine a degree of the bounded error with respect to a velocity error of the vehicle, and wherein the size of the two-dimensional region of the at least a portion of the probabilistic grid is linearly adjusted based on the velocity error.

8. The apparatus as defined in claim 1, wherein the size of the two-dimensional region of the probabilistic grid is expanded linearly with respect to a first order of time.

9. The apparatus as defined in claim 1, wherein the borders of the two-dimensional region of the probabilistic grid are expanded linearly with respect to time.

10. The apparatus as defined in claim 1, wherein the two-dimensional region of the probabilistic grid is linearly expanded as a cylindrical shape.

11. A non-transitory machine readable storage medium comprising instructions to cause programmable circuitry to at least:

move a probabilistic grid of a point mass filter corresponding to navigation of a vehicle based on movement of the vehicle; and linearly adjust a size of a two-dimensional region of the probabilistic grid with respect to time based on a bounded error corresponding to the movement of the vehicle.

12. The non-transitory machine readable storage medium as defined in claim 11, wherein the instructions cause the programmable circuitry to determine an estimate of a position of the vehicle based on the probabilistic grid.

13. The non-transitory machine readable storage medium as defined in claim 11, wherein the size of the two-dimensional area region is linearly adjusted based on the bounded error with respect to a first order of time.

14. The non-transitory machine readable storage medium as defined in claim 11, wherein the instructions cause the programmable circuitry to identify a point of the probabilistic grid having a highest probability value to estimate a position of the vehicle.

15. The non-transitory machine readable storage medium as defined in claim 14, wherein the instructions cause the programmable circuitry to center the probabilistic grid based on the identified one of the points.

16. The non-transitory machine readable storage medium as defined in claim 11, wherein the instructions cause the programmable circuitry to smooth the probabilistic grid.

17. The non-transitory machine readable storage medium as defined in claim 11, wherein the instructions cause the programmable circuitry to determine the bounded error with respect to a velocity error of the vehicle, and wherein the linear adjustment of the size of the two-dimensional region of the probabilistic grid is based on the velocity error.

18. A method comprising:

moving, by executing instructions with programmable circuitry, a probabilistic grid of a point mass filter for navigation of a vehicle based on a movement of the vehicle; and linearly adjusting, by executing instructions with the programmable circuitry, a size of a two-dimensional region of at least a portion of the probabilistic grid with respect to time based on a bounded error corresponding to movement of the vehicle.

19. The method as defined in claim 18, further including smoothing, by executing instructions with the programmable circuitry, the probabilistic grid.

20. The method as defined in claim 18, further including determining, by executing instructions with the programmable circuitry, the bounded error with respect to a velocity error of the vehicle, and wherein the linear adjustment of the size of the two-dimensional region of the probabilistic grid is based on the velocity error.

\* \* \* \* \*